(12) United States Patent
Shigezumi et al.

(10) Patent No.: US 8,492,041 B2
(45) Date of Patent: Jul. 23, 2013

(54) SOLID OXIDE FUEL CELL

(75) Inventors: Tsukasa Shigezumi, Kitakyushu (JP);
 Toshiharu Ooe, Kitakyushu (JP);
 Katsuhisa Tsuchiya, Kitakyushu (JP);
 Kiyotaka Nakano, Kitakyushu (JP);
 Yoshiyuki Kawamura, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 13/262,174

(22) PCT Filed: Mar. 31, 2010

(86) PCT No.: PCT/JP2010/055914
 § 371 (c)(1),
 (2), (4) Date: Sep. 29, 2011

(87) PCT Pub. No.: WO2010/114047
 PCT Pub. Date: Oct. 7, 2010

(65) Prior Publication Data
 US 2012/0021317 A1 Jan. 26, 2012

(30) Foreign Application Priority Data

Mar. 31, 2009 (JP) .................................. 2009-087231

(51) Int. Cl.
 *H01M 8/04* (2006.01)
 *H01M 8/12* (2006.01)
(52) U.S. Cl.
 USPC ............................ 429/430; 429/432; 429/495
(58) Field of Classification Search
 None
 See application file for complete search history.

(56) References Cited

U.S. PATENT DOCUMENTS

| | | | | |
|---|---|---|---|---|
| 2004/0253495 | A1* | 12/2004 | LaVen | 429/23 |
| 2006/0014063 | A1* | 1/2006 | Kokubo | 429/23 |
| 2007/0224471 | A1 | 9/2007 | Tanaka et al. | |

FOREIGN PATENT DOCUMENTS

| | | |
|---|---|---|
| DE | 19523260 A1 | 3/1997 |
| JP | 05-003041 A | 1/1993 |
| JP | 2003-217627 A | 7/2003 |
| JP | 2004-164909 A | 6/2004 |
| JP | 2006-244821 A | 9/2006 |
| JP | 2007-087756 A | 4/2007 |
| JP | 2008-159362 A | 7/2008 |

OTHER PUBLICATIONS

International Search Report for International Application No. PCT/JP2010/055914, dated Jul. 20, 2010, 2 pages.

(Continued)

*Primary Examiner* — John S Maples
(74) *Attorney, Agent, or Firm* — Brinks Hofer Gilson & Lione

(57) ABSTRACT

Provides a solid oxide fuel cell with which product life can be extended while a practical output power is maintained. The present invention is a solid oxide fuel cell, having a fuel cell module (2), a fuel supply device (38), an oxidant gas supply device (45), and a controller (110) for controlling the fuel supply amount; whereby the controller is furnished with a degradation determining circuit (110*a*) for determining degradation in a fuel cell module, and with a fuel correction circuit (110*b*) for correcting operating conditions based on a degradation determination; the fuel correction circuit can execute an increasing correction mode for increasing the fuel supply amount supplied to the fuel cell module so that rated output power is maintained, or can execute a decreasing correction mode for reducing rated output voltage so that the fuel supply amount is reduced; there is also a mode selection device (110*c*) for selecting correction modes.

4 Claims, 18 Drawing Sheets

OTHER PUBLICATIONS

Written Opinion of the International Searching Authority for International Application No. PCT/JP2010/055914, dated Jul. 20, 2010, 3 pages.
International Preliminary Report on Patentability for International Application No. PCT/JP2010/055914, dated Nov. 15, 2011, 5 pages.

Extended European Search Report for European Application No. 10758818.8, dated Mar. 4, 2013, 5 pages.
Extended European Search Report Replacement for European Application No. 10758818.8, dated Mar. 14, 2013, 6 pages.

* cited by examiner

SOLID OXIDE FUEL CELL

This application is a 371 application of PCT/JP2010/055914 having an international filing date of Mar. 31, 2010, which claims priority to JP2009-087231 filed Mar. 31, 2009, the entire contents of which are incorporated herein by reference.

TECHNICAL FIELD

The present invention relates to a solid oxide fuel cell, and more particularly to a solid oxide fuel cell for varying output power in response to required generation amount.

BACKGROUND ART

Solid oxide fuel cells ("SOFCs" below) operate at relatively high temperatures, using an oxide ion conducting solid electrolyte as an electrolyte, with electrodes placed on both sides thereof, and with fuel gas supplied to one side thereof and oxidizer (air, oxygen, or the like) supplied to the other side thereof.

In such SOFCs, steam or $CO_2$ is produced by the reaction between oxygen ions passed through the oxide ion conducting solid electrolyte and fuel, thereby generating electrical and thermal energy. The electrical energy is extracted from the SOFC, where it is used for various electrical purposes. At the same time, thermal energy is used to raise the temperature of the fuel, SOFC, oxidant, and the like.

It is known that fuel cell units degrade with usage over long time periods. Unexamined Patent Application 2007-87756 (Patent Document 1) sets forth a solid oxide fuel cell. It is stated that in this fuel cell, degradation of the fuel cell units can be reduced by adjusting the flow rate of fuel.

A fuel supply amount control device, fuel supply amount control method, and electrical power supply system are also set forth in Unexamined Patent Application 2003-217627 (Patent Document 2). In this fuel supply amount control device, the amount of fuel supplied is compensated when the electrical power extractable from a predetermined amount of fuel supplied decreases due to degradation of fuel cell units.

PRIOR ART REFERENCES

Patent References

Patent Document 1: Unexamined Patent Application 2007-87756
Patent Document 2: Unexamined Patent Application 2003-217627

SUMMARY OF THE INVENTION

Problems the Invention Seeks to Resolve

However, when the fuel supply amount is compensated so that the amount supplied to a degraded fuel cell increases, as in Unexamined Patent Application 2003-217627, thereby maintaining the same level of output as the initial generation output, the problem arises that degradation of the fuel cell is promoted, and product life is shortened. On the other hand, if a control is performed to reduce the power extracted from the degraded fuel cell, degradation of that fuel cell can be restrained from advancing, but since the power extractable from the fuel cell gradually diminishes, the period over which a practical level of power can be extracted becomes shorter.

The present invention therefore has the object of providing a solid oxide fuel cell capable of extending product life while maintaining a practical power output.

Means for Resolving the Problems

To resolve the above-described problems, the present invention is a solid oxide fuel cell having: fuel cell module furnished with multiple fuel cell units; a fuel supply device for supplying fuel to the fuel cell module; an oxidant gas supply device for supplying oxidant gas to the fuel cell module; and a controller for controlling the amount of fuel supplied from the fuel supply device; wherein the controller is furnished with a degradation determining circuit for determining degradation of a fuel cell module, and a fuel correction circuit for correcting operating conditions based on the degradation determination performed by this degradation determining circuit; whereby when it is determined that the fuel cell module has degraded, the fuel correction circuit is capable of executing an increasing correction mode for increasing the fuel supply amount supplied to the fuel cell module so that the rated output power, which is the maximum power output from the fuel cell module, is maintained, and a decreasing correction mode for decreasing the rated output voltage so that the fuel supply amount is reduced; in addition, there is a mode selection device for selecting the increasing correction mode or the decreasing correction mode.

In the present invention thus constituted, the controller controls the fuel supply device and the oxidant gas supply device to supply fuel and oxidant gas to the fuel cell module.

Also, the degradation determining circuit provided with the controller determines degradation in the fuel cell module, and the fuel correction circuit executes a fuel correction when it is determined that the fuel cell module has degraded. The mode selection device selects either the increasing correction mode or the decreasing correction mode as the fuel correction to be executed by the fuel correction circuit.

In the present invention thus constituted, the mode selection device selects the increasing correction mode or the decreasing correction mode, therefore an appropriate mode can be selected in accordance with fuel cell usage conditions, so that product life can be extended while a practical output power is maintained.

In the present invention the mode selection device is preferably a mode selecting operating device capable of being operated to select an increasing correction mode or a decreasing correction mode.

In the present invention thus constituted, an appropriate correction mode can be selected in accordance with anticipated fuel cell usage conditions, such as the point of shipment of the fuel cell from the factory, the point at which it is determined to have degraded, etc.

The present invention preferably has an operating state recording device for recording fuel cell module past operating states, and the mode selection device automatically selects the increasing correction mode or the decreasing correction mode based on the fuel cell module's past operating states recorded in the operating state recording device.

In the present invention thus constituted, the mode selection device selects the correction mode based on past operating states, therefore an appropriate correction mode can be automatically selected.

In the present invention the operating state recording device preferably records past history relating to fuel cell module output power as past operating states of the fuel cell module, and when, during a predetermined past period, the time during which the fuel cell module was outputting the rated output power was longer than the time during which it was outputting less than the rated output power, the mode selection device selects the increasing correction mode, whereas when, during a predetermined past period, the time during which the fuel cell module was outputting the rated output power was shorter than the time during which it was outputting less than the rated output power, the mode selection device selects the decreasing correction mode.

In the present invention thus constituted, if in the past operating states of the fuel cell module the time during which rated output power was being output was longer, the increasing correction mode is selected and the rated output voltage is maintained even after the fuel cell module degrades, therefore grid power usage charges can be saved. On the other hand, if the rated output power output time was shorter, the decreasing correction mode is selected, and rated output voltage declines, therefore the amount of fuel consumption by the fuel cell module, whose efficiency has declined due to degradation, can be restrained and energy can be conserved.

The present invention is a solid oxide fuel cell having: fuel cell module furnished with multiple fuel cell units; a fuel supply means for supplying fuel to the fuel cell module; an oxidant gas supply means for supplying oxidant gas to the fuel cell module; and a control means for controlling the amount of fuel supplied from the fuel supply means; wherein the control means is furnished with a degradation determining means for determining degradation of a fuel cell module, and a fuel correction means for correcting operating conditions based on the degradation determination performed by this degradation determining means; whereby when it is determined for the first time that the fuel cell module has degraded, the fuel correction means is capable of executing an increasing correction mode for increasing the fuel supply amount supplied to the fuel cell module so that rated output power, which is the maximum power output from the fuel cell module, is maintained, and a decreasing correction mode for decreasing the rated power voltage so that the fuel supply amount is reduced; in addition, there is a mode selection means for selecting the increasing correction mode or the decreasing correction mode.

Effect of the Invention

Using the solid oxide fuel cell of the present invention, product life can be extended while maintaining practical output power.

EMBODIMENTS OF THE INVENTION

Next, referring to the attached drawings, we discuss a solid oxide fuel cell (SOFC) according to an embodiment of the present invention.

Figure 1:
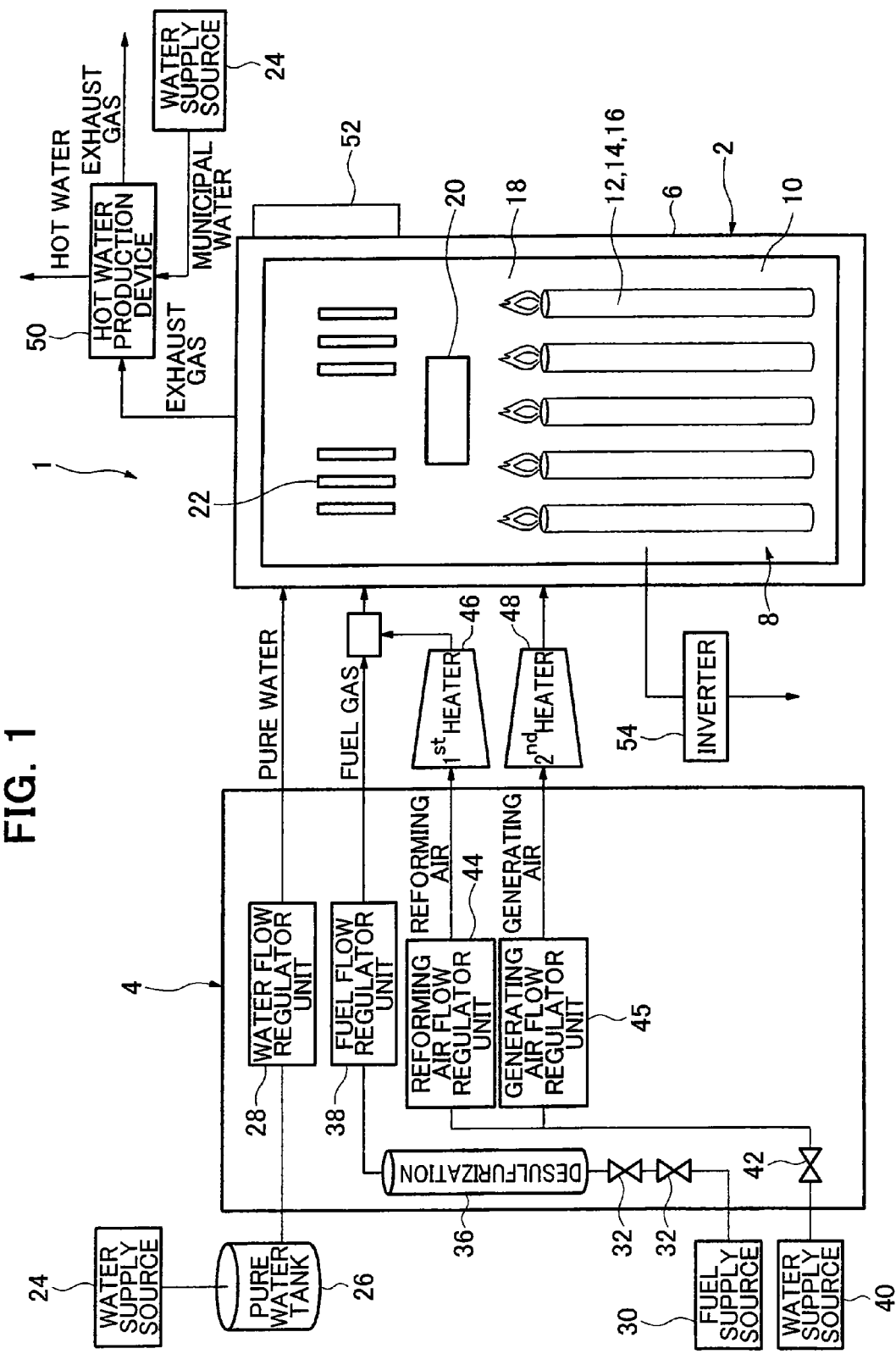
FIG. 1: An overall schematic showing a solid oxide fuel cell (SOFC) according to an embodiment of the present invention.

FIG. 1 is an overview diagram showing a solid oxide fuel cell (SOFC) according to an embodiment of the present invention.

As shown in FIG. 1, the solid oxide fuel cell (SOFC) of this embodiment of the present invention is furnished with a fuel cell module 2 and an auxiliary unit 4.

The fuel cell module 2 is furnished with a housing 6; a sealed space 8 is formed within the housing 6, mediated by insulating material (not shown; the insulating material is not an indispensable structure and may be omitted). Note that it is acceptable not to provide insulating material. A fuel cell assembly 12 for carrying out the electrical generating reaction between fuel gas and oxidant (air) is disposed in the generating chamber 10 at the lower portion of this sealed space 8. This fuel cell assembly 12 is furnished with ten fuel cell stacks 14 (see FIG. 5), and a fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned generating chamber 10 in the fuel cell module 2 sealed space 8; residual fuel gas and residual oxidizer (air) not used in the electrical generation reaction are burned in this combustion chamber 18 and produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving combustion heat and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate of water supplied from the reservoir tank. The auxiliary tank 4 is further furnished with a gas shutoff valve 32 for shutting off the fuel gas supply from a fuel supply source 30 such as municipal gas or the like, and a fuel flow rate regulator unit 38 (a "fuel pump" or the like driven by a motor) for regulating the flow rate of fuel gas. Furthermore, an auxiliary unit 4 is furnished with an electromagnetic valve 42 for shutting off air serving as an oxidizer supplied from an air supply source 40, a reforming air flow rate regulator unit 44 and generating air flow rate regulator unit 45 ("air blower" or the like driven by a motor) for regulating air flow rate, a first heater 46 for heating reforming air supplied to the reformer 20, and a second heater 48 for heating generating air supplied to the generating chamber. This first heater 46 and second heater 48 are provided in order to efficiently raise the temperature at startup, and may be omitted.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater, not shown.

A control box 52 for controlling the amount of fuel gas supplied, etc. is connected to the fuel cell module 2.

Furthermore, an inverter 54 serving as an electrical power extraction unit (electrical power conversion unit) for supplying electrical power generated by the fuel cell module to the outside is connected to the fuel cell module 2.

Figure 2:
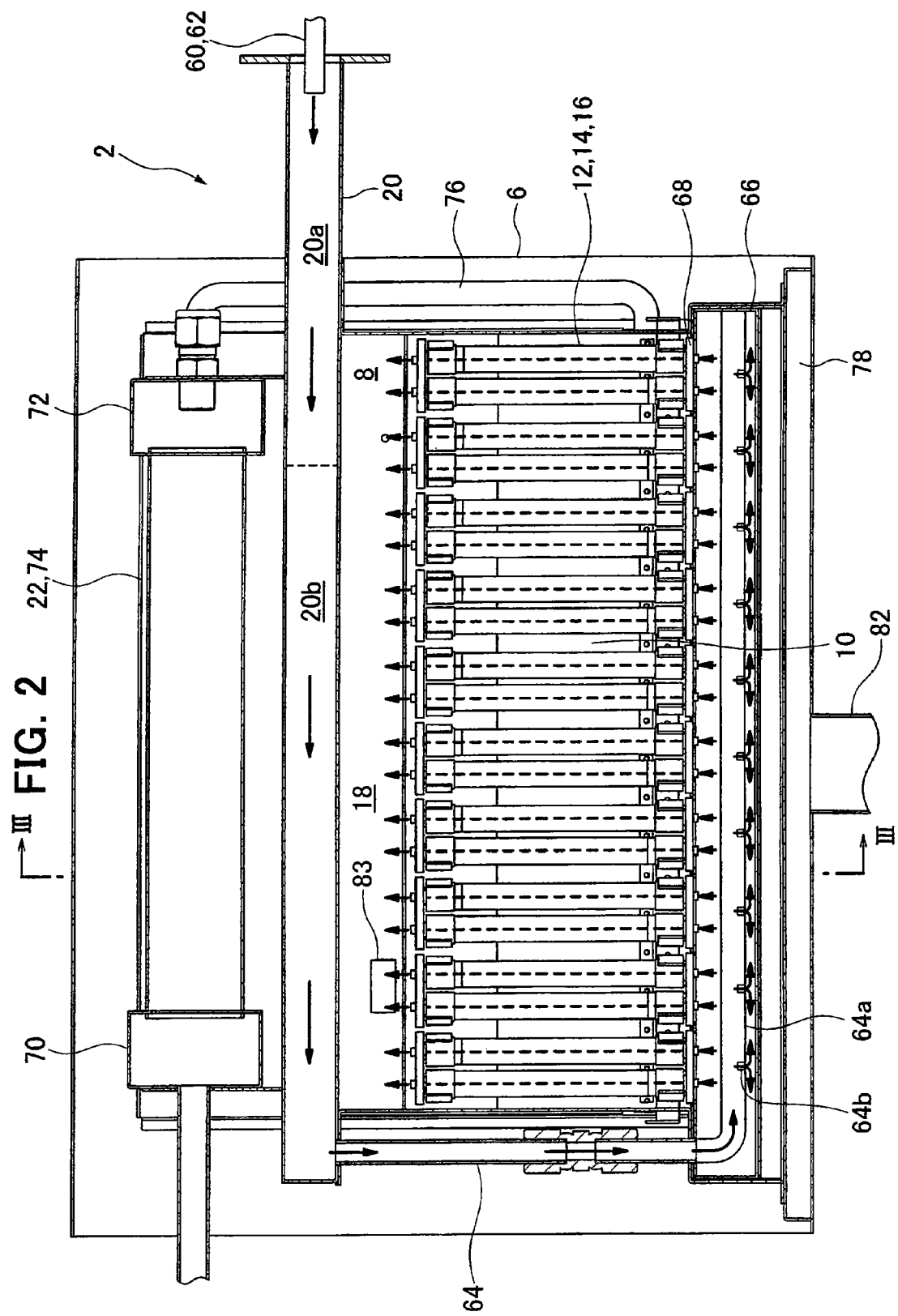
FIG. 2: A front elevation sectional diagram showing a solid oxide fuel cell (SOFC) fuel cell module according to an embodiment of the present invention.
Figure 3:
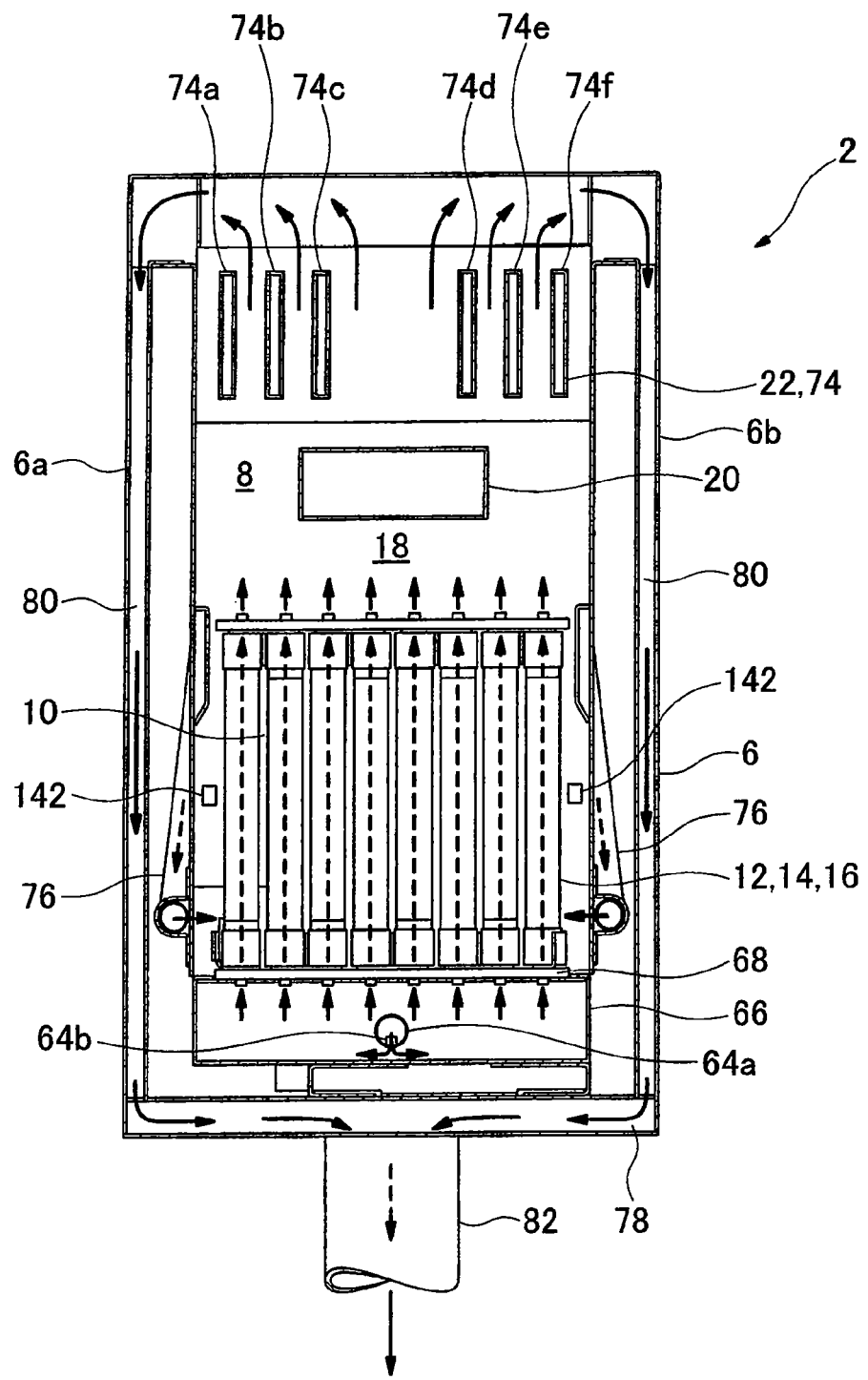
FIG. 3: A sectional diagram along line in FIG. 2.

The internal structure of the solid oxide fuel cell (SOFC) fuel cell module of this embodiment of the present invention is explained using FIGS. 2 and 3. FIG. 2 is a side elevation sectional diagram showing a fuel cell module in a solid oxide fuel cell (SOFC) according to an embodiment of the present invention; FIG. 3 is a sectional diagram along line of FIG. 2.

As shown in FIGS. 2 and 3, starting from the bottom in the sealed space 8 within the fuel cell module 2 housing 6, a fuel cell assembly 12, a reformer 20, and an air heat exchanger 22 are arranged in sequence, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of aluminum spheres, or ruthenium is imparted to aluminum spheres.

A fuel gas supply line 64 is connected to the downstream end of the reformer 20; this fuel gas supply line 64 extends downward, then further extends horizontally within a manifold 66 formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

Next, an air heat exchanger 22 is provided over the reformer 20. This air heat exchanger 22 is furnished with an air concentration chamber 70 on the upstream side and two air distribution chambers 72 on the downstream side; these air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top end side of the exhaust gas conduit 80 communicates with the space in which the air heat exchanger 22 is disposed, and the bottom end side communicates with the exhaust gas chamber 78. An exhaust gas discharge pipe 82 is connected at approximately the center of the bottom surface of the exhaust gas chamber 78; the downstream end of this exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18.

Figure 4:
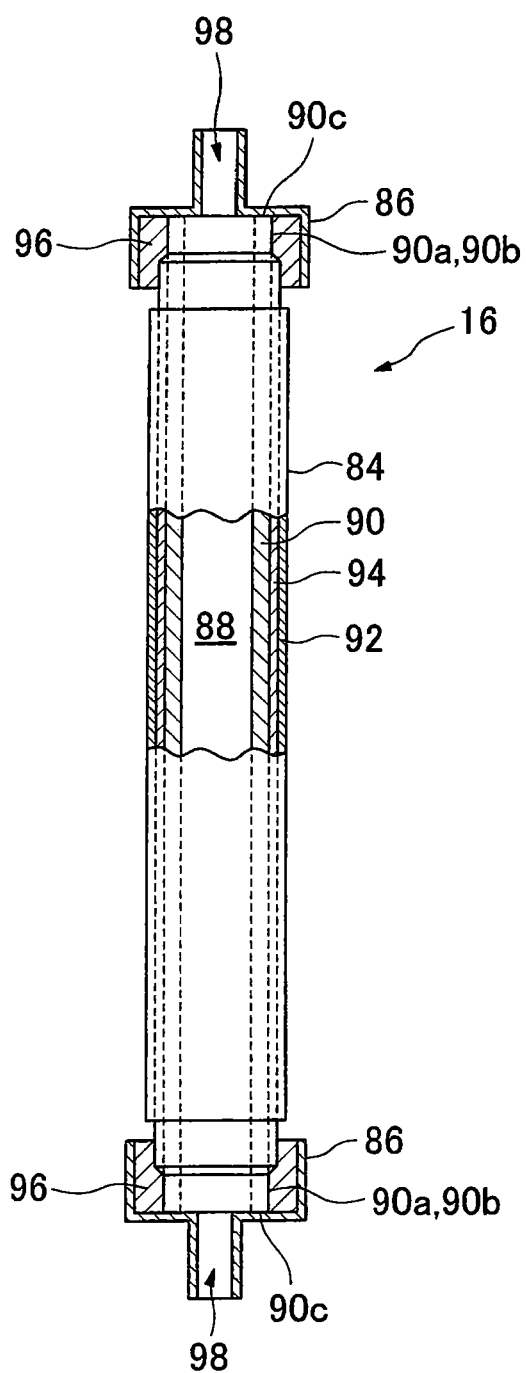
FIG. 4: A partial section showing a solid oxide fuel cell (SOFC) fuel cell unit according to an embodiment of the present invention.

Next we discuss the fuel cell unit 16, referring to FIG. 4. FIG. 4 is a partial section showing a solid oxide fuel cell (SOFC) fuel cell unit according to an embodiment of the present invention.

As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. This internal electrode layer 90 is a fuel electrode through which fuel gas passes, and is a (−) pole, while the external electrode layer 92 is an air electrode which contacts the air, and is a (+) pole.

The internal electrode terminals 86 attached at the top end and bottom ends of the fuel cell device 16 have the same structure, therefore we will here discuss specifically the internal electrode terminal 86 attached at the top end side. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with the inside electrode layer 90 fuel gas flow path 88 is formed at the center portion of the inside electrode terminal 86.

The inside electrode layer 90 is formed, for example, from at least one of a mixture of Ni and zirconia doped with at least one type of rare earth element selected from Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
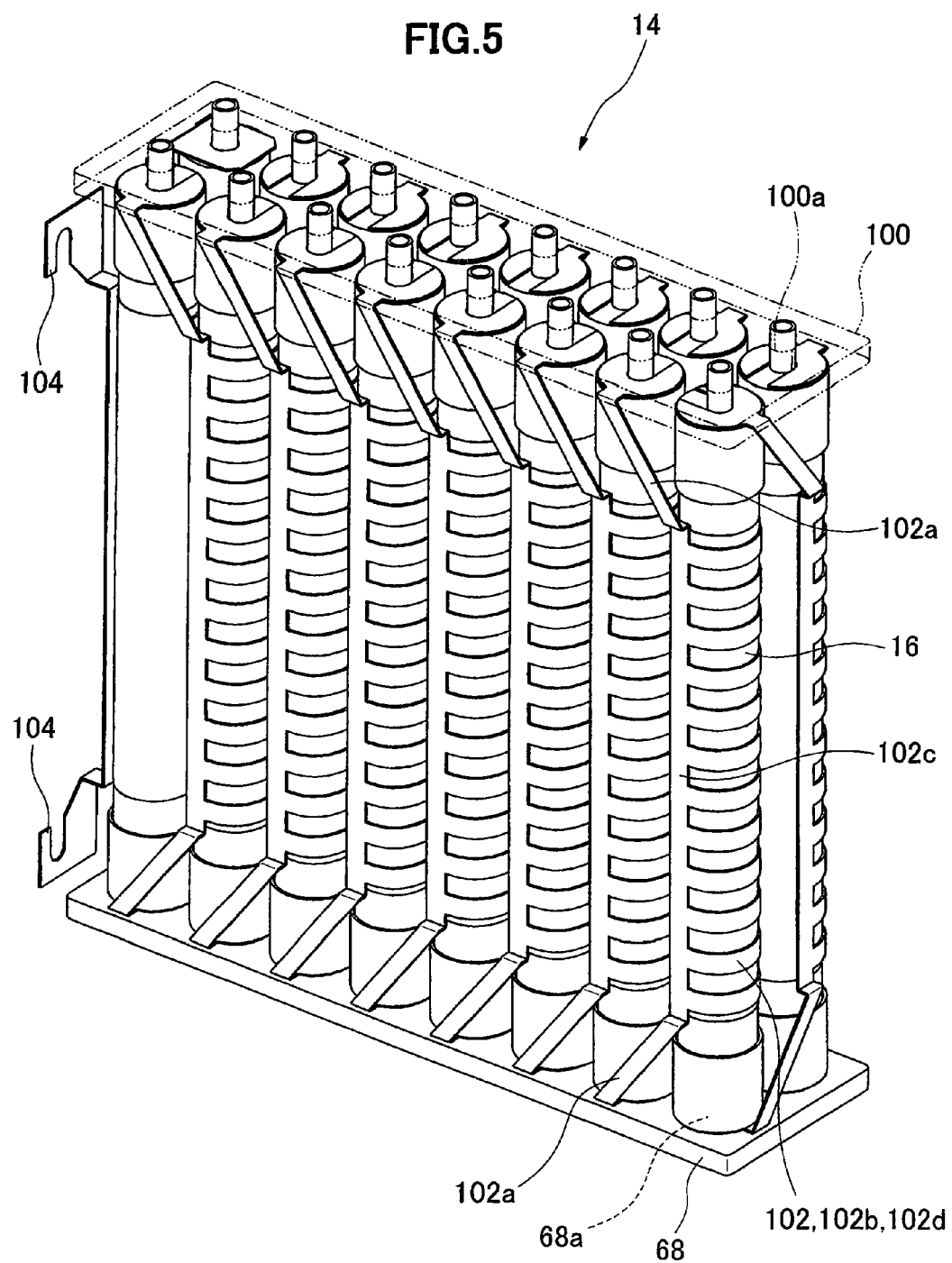
FIG. 5: A perspective diagram showing a solid oxide fuel cell (SOFC) fuel cell stack according to an embodiment of the present invention.

Next we discuss the fuel cell stack 14, referring to FIG. 5. FIG. 5 is a perspective view showing the fuel cell stack in a solid oxide fuel cell (SOFC) according to an embodiment of the present invention.

As shown in FIG. 5, the fuel cell stack 14 is furnished with sixteen fuel cell units 16; the top end side and bottom end side of these fuel cell units 16 are respectively supported by a lower support plate 68 and upper support plate 100. Through holes 68a and 100a, through which the inside electrode terminal 86 can penetrate, are provided on this lower support plate 68 and outer support plate 100.

In addition, a current collector 102 and an external terminal 104 are attached to the fuel cell unit 16. This current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter surface of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from this vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, electrode terminals 86 at the top and bottom ends of the two fuel cell units 16 positioned at the end of the fuel cell stack 14 (at the front and back sides on the left edge in FIG. 5) are respectively connected to the outside terminals 104. These external terminals 104 are connected to the external terminals 104 (not shown) at the ends of the adjacent fuel cell stack 14, and as described above, all of the 160 fuel cell units 16 are connected in series.

Figure 6:
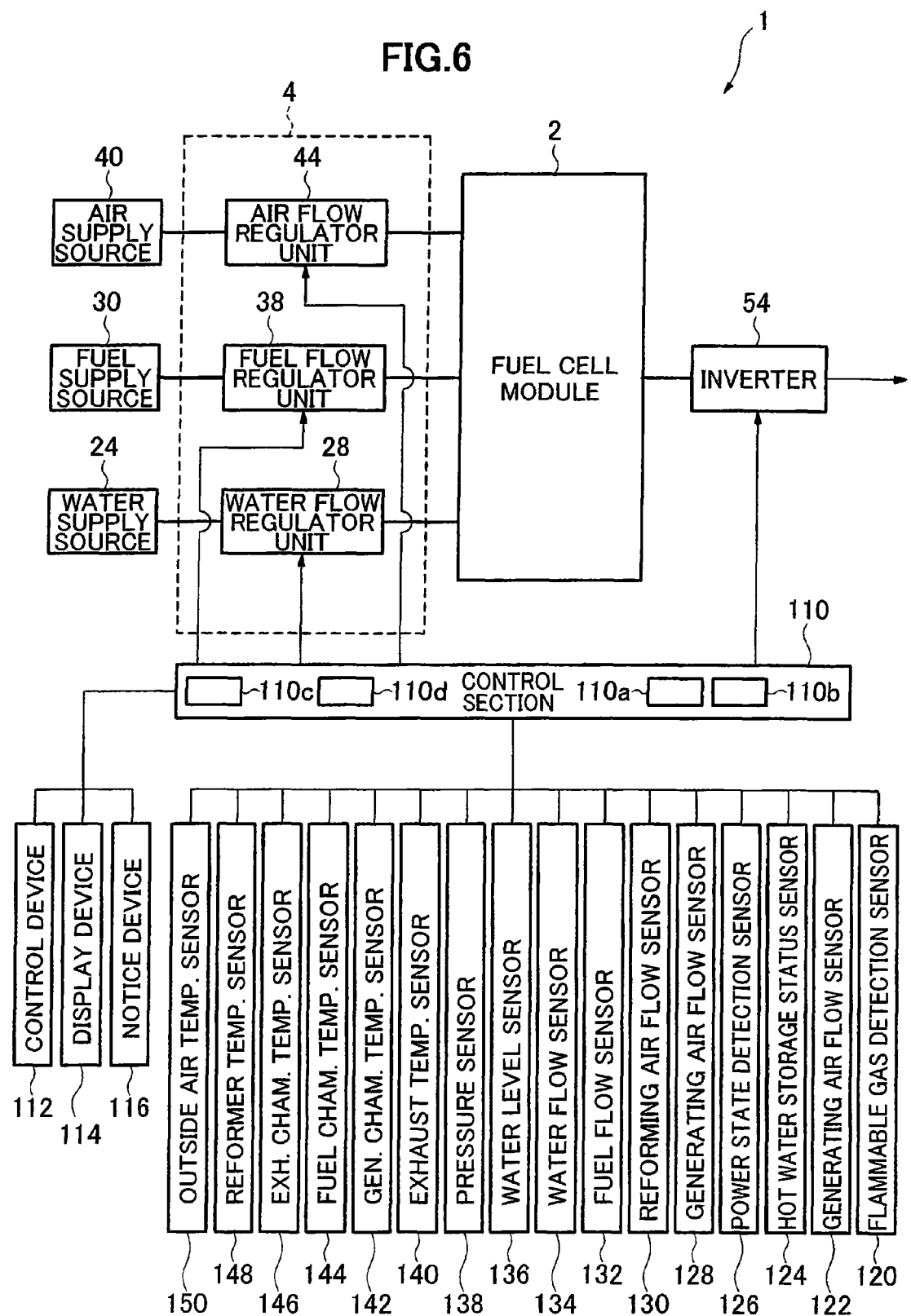
FIG. 6: A block diagram showing a solid oxide fuel cell (SOFC) according to an embodiment of the present invention.

Next, referring to FIG. 6, we discuss the sensors attached to the solid oxide fuel cell (SOFC) according to the present embodiment. FIG. 6 is a block diagram showing a solid oxide fuel cell (SOFC) according to an embodiment of the present invention.

As shown in FIG. 6, a solid oxide fuel cell device 1 is furnished with a control unit 110; an operating device 112 provided with operating buttons such as "ON" or "OFF" for user operation, a display device 114 for displaying various data such as a generator output value (Watts), and a notification device 116 for issuing warnings during abnormal states and the like are connected to this control unit 110. This notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the CO gas detection sensor 120 is to detect leakage of CO in the exhaust gas, which is meant to be exhausted to the outside via the exhaust gas conduit 80, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A generator air flow rate detection sensor 128 detects the flow rate of generator air supplied to the generating chamber 10.

A reforming air flow rate sensor 130 detects the rate of reforming air flow supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) is placed outdoors, the outside temperature sensor 150 detects the temperature of the outside atmosphere. Sensors to detect outside atmospheric humidity and the like may also be provided.

Signals from these various sensor types are sent to the control unit 110; the control unit 110 sends control signals to the water flow rate regulator unit 28, the fuel flow rate regulator unit 38, the reforming air flow rate regulator unit 44, and the generating air flow rate regulator unit 45 based on data from the sensors, and controls the flow rates in each of these units.

The control unit 110 sends control signals to the inverter 54 to control the amount of electrical power supply.

Figure 7:
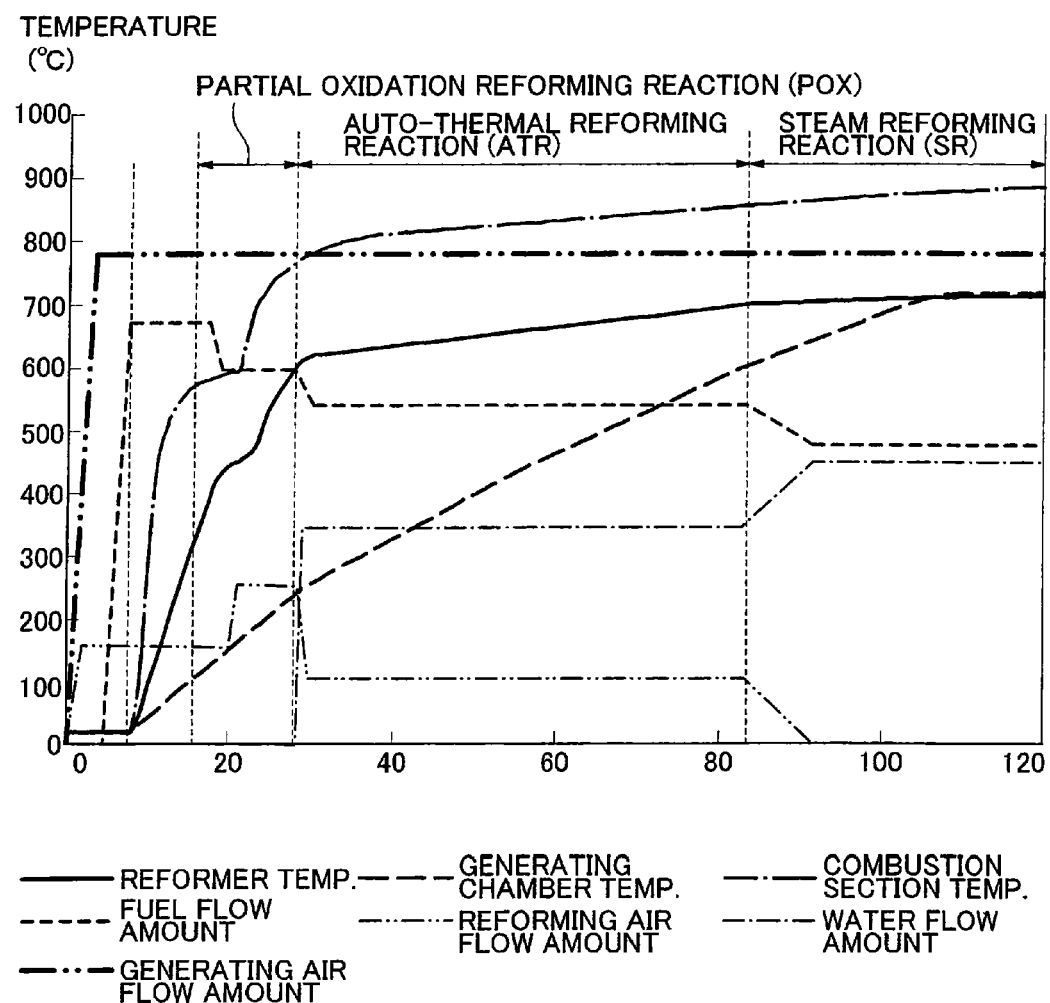
FIG. 7: A timing chart showing the operation at the time of startup of a solid oxide fuel cell (SOFC) according to an embodiment of the present invention.

Next, referring to FIG. 7, we discuss the operation of a solid oxide fuel cell (SOFC) according to the present embodiment at the time of start up.

FIG. 7 is a timing chart showing the operations of a solid oxide fuel cell (SOFC) according to an embodiment of the present invention at the time of start up.

At the beginning, in order to warm up the fuel cell module 2, operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 through a first heater 46 to the reformer 20 on the fuel cell module 2. At the same time, generating air is supplied from the generating air flow rate regulator unit 45 through a second heater 48 to the air heat exchanger 22 of the fuel cell module 2, and this generating air reaches the generating chamber 10 and the combustion chamber 18.

Immediately thereafter, fuel gas is also supplied from the fuel flow rate regulator unit 38, and fuel gas into which reform air is blended passes through the reformer 20, the fuel cell stack 14, and the fuel cell unit 16 to reach the combustion chamber 18.

Next, ignition is brought about by the ignition device 83, and fuel gas and air (reforming air and generating air) supplied to the combustion chamber 18 is combusted. This combustion of fuel gas and air produces exhaust gas; the generating chamber 10 is warmed by this exhaust gas, and when the exhaust gas rises in the fuel cell module 2 sealed space 8, the fuel gas, which includes reforming air in the reformer 20 is warmed, as is the generating air inside the air heat exchanger 22.

At this point, fuel gas into which reform air is blended is supplied to the reformer 20 by the fuel flow rate regulator unit 38 and the reforming air flow rate regulator unit 44, therefore the partial oxidation reforming reaction PDX given by Expression (1) proceeds. This partial oxidation reforming reaction PDX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the combustion chamber 18 is also heated by the combustion of the fuel gas and air, so that the fuel stack 14 is also heated from above, enabling as a result an essentially uniform rise in temperature in the vertical direction of the fuel cell stack 14. Even though the partial oxidation reforming reaction PDX is progressing, the ongoing combustion reaction between fuel gas and air is continued in the combustion chamber 18.

$$C_mH_n + xO_2 \rightarrow aCO_2 + bCO + cH_2 \quad (1)$$

When the reformer temperature sensor 148 detects that the reformer 20 has reached a predetermined temperature (e. g. 600° C.) after the start of the partial oxidation reforming reaction PDX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction PDX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction PDX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, no major drop in temperature will be caused. Also, the combustion reaction continues within the combustion chamber 18 even as the auto-thermal reforming reaction ATR proceeds.

When the reformer temperature sensor 146 detects that the reformer 20 has reached a predetermined temperature (e. g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

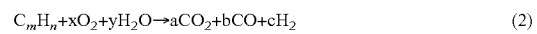

$$C_mH_n + xO_2 + yH_2O \rightarrow aCO_2 + bCO + cH_2 \quad (2)$$

$$C_mH_n + xH_2O \rightarrow aCO_2 + bCO + cH_2 \quad (3)$$

This steam reforming reaction SR is an endothermic reaction, therefore the reaction proceeds as a thermal balance is maintained with the combustion heat from the combustion chamber 18. At this stage, the fuel cell module is in the final stages of startup, therefore the temperature has risen to a sufficiently high level within the generating chamber 10 so that no major temperature dropped is induced in the generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction PDX, the auto-thermal reforming reaction ATR, and the steam reforming reaction SR which proceed in that sequence. Next, when the temperature inside the generating chamber 10 and the temperature of the fuel cell 84 reaches a predetermined generating temperature which is lower than the rated temperature at which the cell module 2 can be stably operated, the circuit which includes the fuel cell module 2 is closed, electrical generation by the fuel cell module 2 begins, and current then flows to the circuit. Generation of electricity by the fuel cell module 2 causes the fuel cell 84 itself to emit heat, such that the temperature of the fuel cell 84 rises. As a result, the rated temperature at which the fuel cell module 2 is operated becomes, for example, 600° C.-800° C.

Following this, a amount of fuel gas and air greater than that consumed by the fuel cell 84 is applied in order to maintain the rated temperature and continue combustion inside the combustion chamber 18. Generation of electricity by the high reform-efficiency steam reforming reaction SR proceeds while electricity is being generated.

Figure 8:
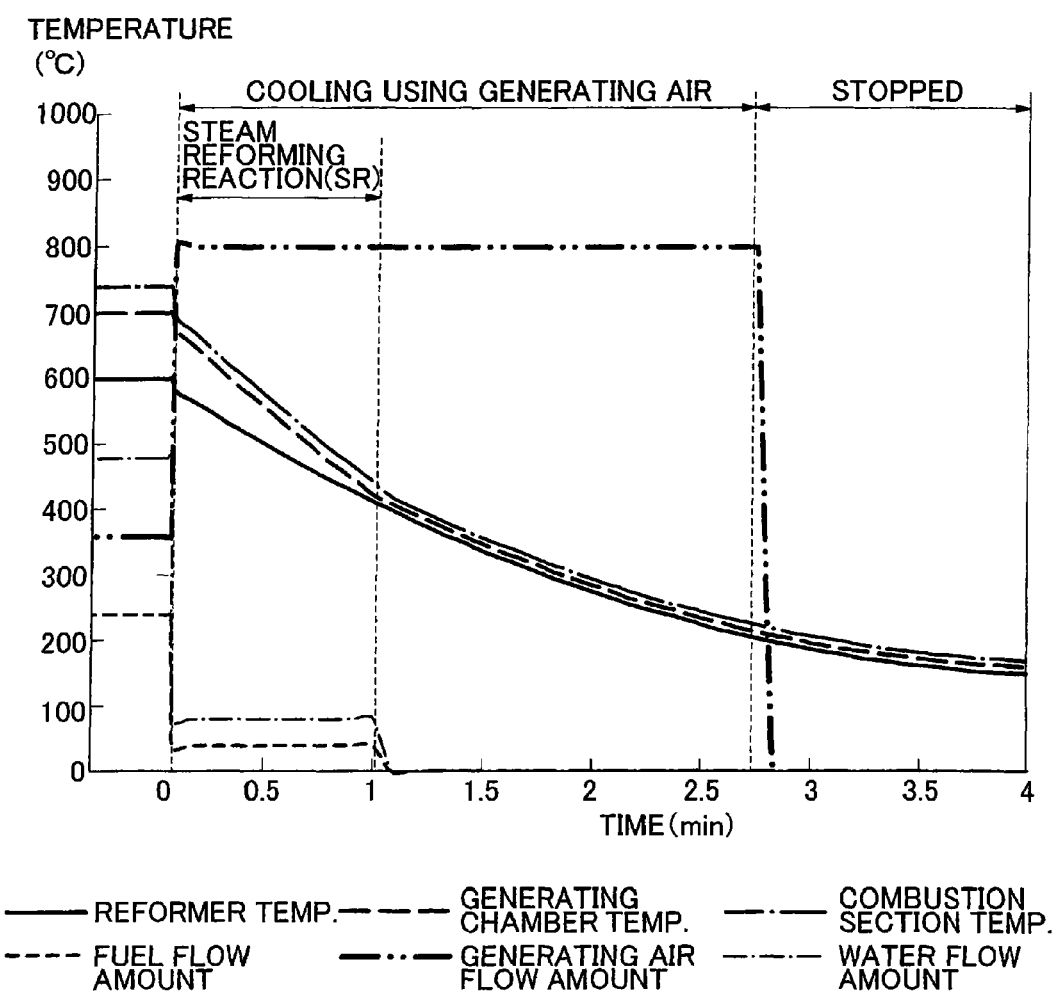
FIG. 8: A timing chart showing the operation at the time of shutdown of a solid oxide fuel cell (SOFC) according to an embodiment of the present invention.

Next, referring to FIG. 8, we discuss the operation upon stopping the solid oxide fuel cell (SOFC) of the present embodiment. FIG. 8 is a timing chart showing the operations which occur upon stopping the solid oxide fuel cell (SOFC) of the present embodiment.

As shown in FIG. 8, when stopping the operation of the fuel cell module 2, the fuel flow rate regulator unit 38 and the water flow rate regulator unit 28 are first operated to reduce the amount of fuel gas and steam being supplied to the reformer 20.

When stopping the operation of the fuel cell module 2, the amount of generating air supplied by the reforming air flow rate regulator unit 44 into the fuel cell module 2 is being increased at the same time that the amount of fuel gas and steam being supplied to the reformer 20 is being reduced; the fuel cell assembly 12 and the reformer 20 are air cooled to reduce their temperature. Thereafter, when the temperature of the generating chamber drops to, for example, 400° C., supply of the fuel gas and steam to the reformer 20 is stopped, and the steam reforming reaction SR in the reformer 20 ends. Supply of the generating air continues until the temperature in the reformer 20 reaches a predetermined temperature, e. g. 200° C.; when the predetermined temperature is reached, the supply of generating air from the generating air flow rate regulator unit 45 is stopped.

Thus in the present embodiment the steam reforming reaction SR by the reformer 20 and cooling by generating air are used in combination, therefore when the operation of the fuel cell module 2 is stopped, that operation can be stopped relatively quickly.

Next, referring to FIGS. 9 through 14, we discuss the operation of the solid oxide fuel cell 1 according to an embodiment of the present invention.

First, referring to FIGS. 9 through 12, we discuss the load following operation of the solid oxide fuel cell 1 and the fuel cell module 2 degradation determination.

Figure 9:
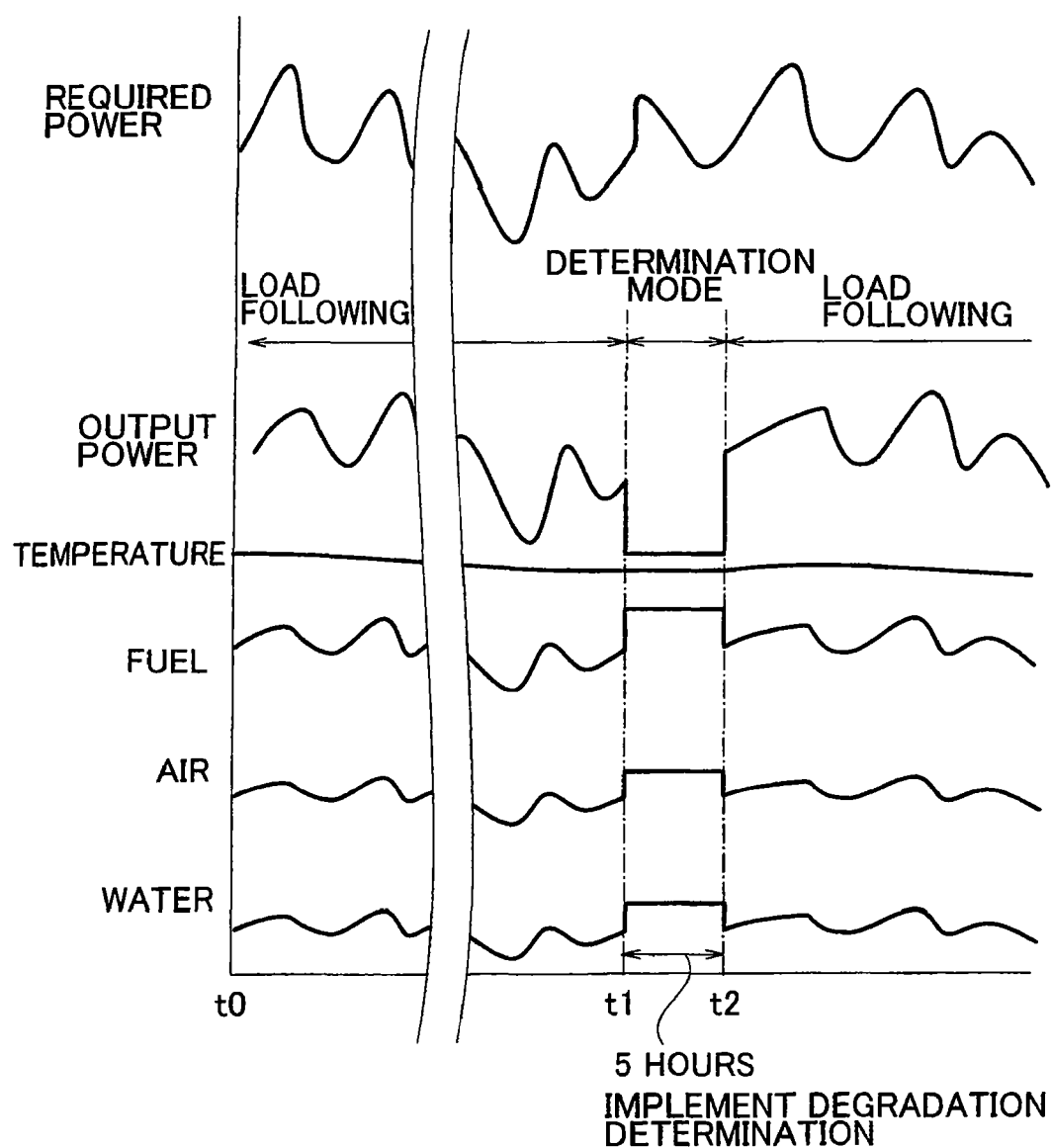
FIG. 9: A timing chart explaining the determination of degradation in a solid oxide fuel cell (SOFC) according to an embodiment of the present invention.
Figure 10:
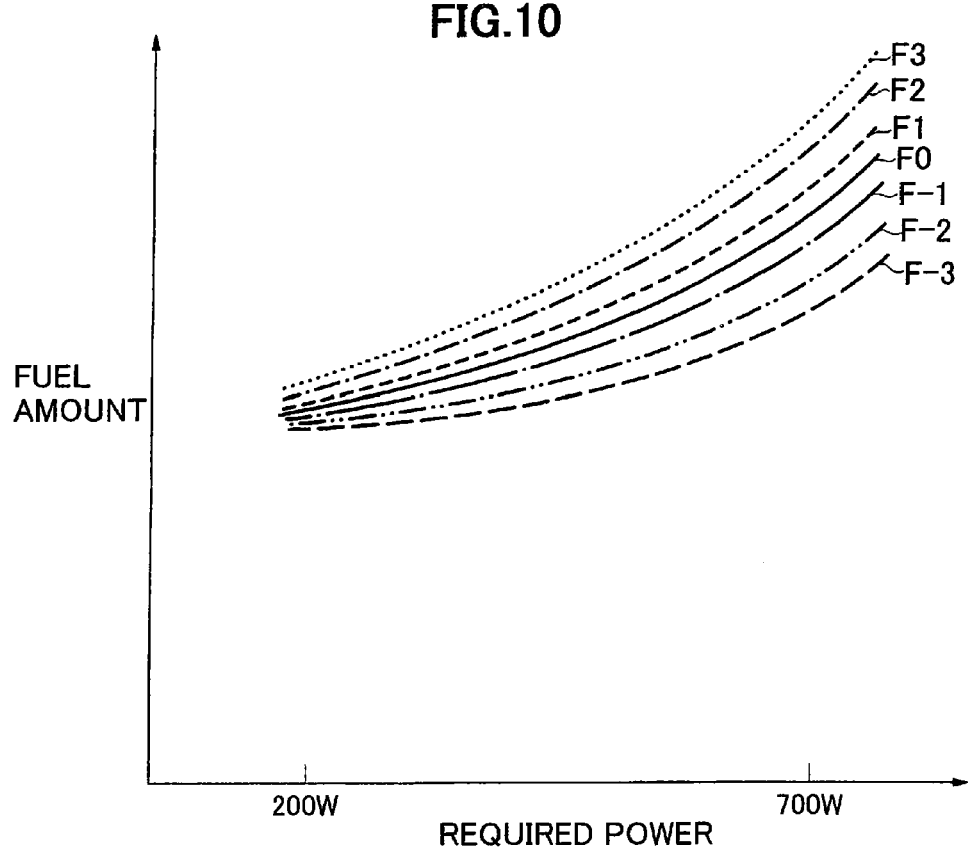
FIG. 10: A graph showing an example of the relationship between the required generation amount input to the control section and the fuel supply amount required to produce the required generation amount.
Figure 11:
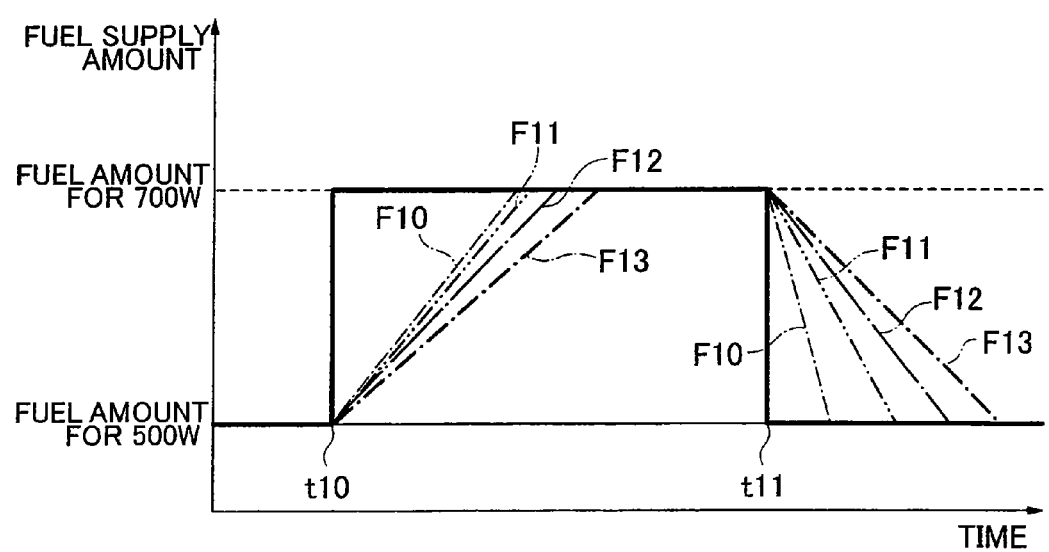
FIG. 11: A graph showing an example of the change over time in fuel supply amount relative to the change in required generation amount.
Figure 12:
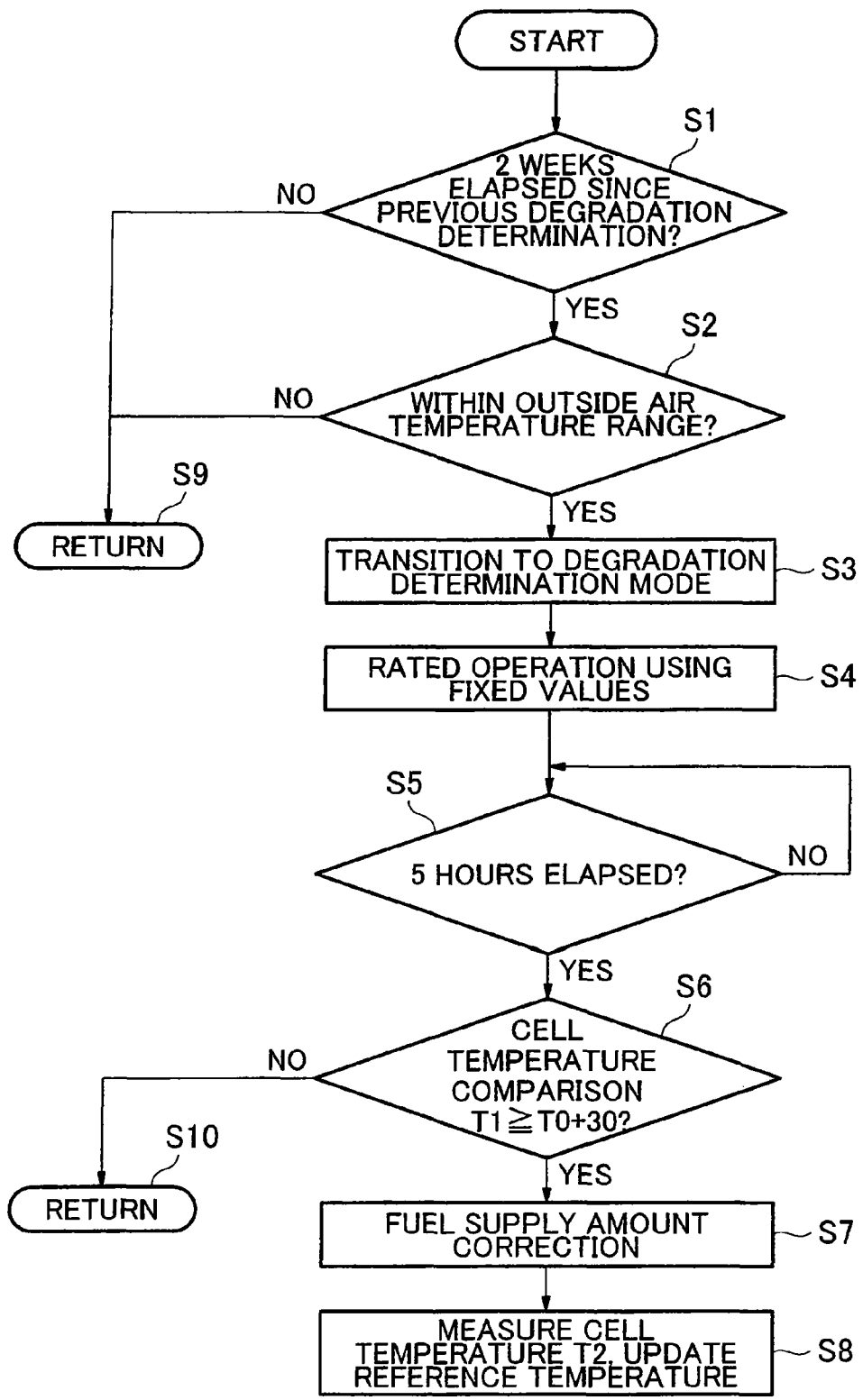
FIG. 12: A flow chart showing a degradation determination procedure using a degradation determining circuit.

FIG. 9 is a timing chart explaining the determination of degradation in a solid oxide fuel cell (SOFC) according to an embodiment of the present invention. FIG. 10 is graph showing an example of the relationship between the required generation amount input to the control section 110 and the fuel supply amount required to produce the required generation amount. FIG. 11 is graph showing an example of the change over time in fuel supply amount relative to the change in required generation amount. FIG. 12 is a flow chart showing a degradation determination procedure using a degradation determining circuit.

At times t0-t1 in FIG. 9, the solid oxide fuel cell 1 is performing a load following operation so that an output power can be obtained in accordance with the amount of generation required by the inverter 54 (FIG. 6). As shown in FIG. 6, that is, the control section 110 serving as controller sends signals to the fuel flow rate regulator unit 38 serving as fuel supply device, the reforming air flow regulator unit 44 serving as oxidant gas supply device, and the water flow rate regulator unit 28 serving as water supply device in accordance with the amount of generation required from the inverter 54, and supplies the required flow rates of fuel, air, and water to the fuel cell module 2. The output power of the solid oxide fuel cell 1 thus varies, as shown in FIG. 9, so as to follow the amount of generation required from the inverter 54. A delay is here applied to the fuel supply amount, so output power is delayed relative to the amount of fuel supplied, and there is virtually no change in output power relative to sudden changes in the required generation amount. Note that the control section 110, the fuel flow rate regulator unit 38, the generating air flow rate regulator unit 45, and the water flow rate regulator unit 28 respectively function as a control means, a fuel supply means, an oxidant gas supply means, and a water supply means.

The control section 110 determines the fuel supply amount using a graph, one example of which is shown in FIG. 10, in response to the amount of generation required from the inverter 54 and controls the fuel flow rate regulator unit 38 such that the determined amount (flow rate) of fuel is supplied to the fuel cell module 2. After the initial start of use of the solid oxide fuel cell 1 up until a determination is made that the fuel cell module 2 has degraded, the control section 110 determines a fuel supply amount relative to the required generation amount in accordance with curve F0 in FIG. 10. As shown in FIG. 10, the fuel supply amount is determined in such a way that it grows monotonically with the increase in required generation amount, but under a required generation amount of approximately 200 W, the fuel supply amount is approximately a fixed value.

When the required generation amount is changed, sudden changes in the fuel supply amount can hasten degradation of the fuel cell module 2, therefore the fuel supply amount is gradually increased or decreased as shown in FIG. 11. FIG. 11 is a graph showing an example of the change in fuel supply amount versus time when the required generation amount is changed in a stepped manner from 500 W to 700 W. As shown in FIG. 11, when the required generation amount is changed from 500 W to 700 W at time t10, the required fuel supply amount is suddenly changed from a fuel supply amount for an output power of 500 W to one corresponding to 700 W. In response, the control section 110 controls the fuel flow rate regulator unit 38 so that the fuel supply amount is increased slowly, as shown by the imaginary line in FIG. 11, to avoid a sudden increase in the fuel supply amount. Note that after the initial start of use of the solid oxide fuel cell 1, up until a determination is made that the fuel cell module 2 has degraded, the control section 110 increases the fuel supply amount in accordance with the line F10 in FIG. 11.

Similarly at time t11, even if the required generation amount changes from 700 W to 500 W, the control section 110 gradually decreases the fuel supply amount as shown by line F10 in FIG. 11 so that there is not a sudden decrease in the fuel supply amount. Note that the rate of change in the fuel supply amount is set to be more gradual when increasing the fuel supply amount than when decreasing it.

Note that FIGS. 10 and 11 relate to fuel supply amount, but changes occur similarly in the air supply amount and water supply amount relative to the required generation amount.

Next, at time t1 in FIG. 9, the degradation determining circuit 110a serving as degradation determining means built into the control section 110 starts operation of the degradation determining mode (FIG. 6). Note that the degradation determining circuit 110a comprises a microprocessor, a memory, a program for activating same, and the like (none of the above is shown). FIG. 12 is a flow chart showing the process carried out by the degradation determining circuit 110a.

The flow chart shown in FIG. 12 is executed at a regular predetermined time interval by the degradation determining circuit 110a. First, in step S1, a determination is made of time elapsed since the previous degradation determining mode operation. If the predetermined 2 week degradation determining interval has not elapsed since the previous degradation determining mode operation, the system advances to step S9, and one iteration of this flow chart is completed. This process makes it possible to prevent wasting of fuel, etc. caused by unnecessarily frequent execution of the degradation determining mode operation.

If the 2 week degradation determining interval or more has elapsed since the previous degradation determining mode operation, the system advances to step S2, and a judgment is made as to whether the solid oxide fuel cell 1 external environment is in a predetermined degradation determining atmosphere state appropriate to the degradation determining mode operation. Specifically, a determination is made as to whether the outside air temperature and outside air humidity detected by the outside air temperature sensor 150 (FIG. 6) and outside air humidity sensor (not shown) conform to predetermined conditions. In the present embodiment, if the outside air temperature is 5-30° C. and the outside air humidity is 30-70%, the outside environment is judged to be in a degradation determining atmospheric state appropriate to the degradation determining mode operation. If it is judged that the external environment is not in a degradation determining outside atmospheric state, the system advances to step S9, and one iteration of this flow chart is completed.

Note that this embodiment is constituted so that the degradation determination is performed on a biweekly cycle, but that high frequency is a disadvantage from the standpoint of energy conservation, since it means a forced changeover to the degradation determining mode, described below, with no load following control. It is therefore desirable that this be set according to the degree of performance degradation; a frequency of once every 6 months is desirable if degradation is small. An even more desirable format would be to use a frequency of once a year in the initial period when the length of time operated is still short, since there is little degradation, then as the operating length grows to 5 years, 10 years, and so forth, to shorten the determination period length. In the present embodiment we have adopted an extremely easy to understand form as an example.

When the outside environment is suited to the degradation determining mode operation, the system advances to step S3, and the degradation determining mode operation is started.

Moreover, in step S4 certain values are fixed at predetermined supply amounts for which fuel, air, and water supply amounts are set in advance. In other words, in the degradation determining mode operation, the degradation determining circuit 110a controls the fuel flow rate regulator unit 38, the generating air flow rate regulator unit 45, and the water flow rate regulator unit 28 so that they maintain a fixed fuel supply amount irrespective of the generation amount being required of the control section 110. At time t1 in FIG. 9 of the present embodiment, the degradation determining fuel supply amount is fixed at 3 L/min, the degradation determining oxidant gas supply amount at 100 L/min, and the degradation determining water supply amount at 8 mL/min.

These fixed values for the fuel, air, and water supply amounts are supply amounts obtained in advance by experimentation as the amounts with which 700 W, which is the rated generation amount of the solid oxide fuel cell 1 of the present embodiment, can be generated. Therefore although there are individual differences between fuel cells, the solid oxide fuel cell 1 has the ability to output 700 W during the time when fuel, air, and water are supplied at these fixed values. However, if the power extracted from the fuel cell module 2 changes in response to the required generation amount, then even if the fuel supply amount etc. are fixed, the operating state of the fuel cell module 2 will not be sufficiently stable. For this reason, in the present embodiment power is not extracted from the fuel cell module 2 during the degradation determining mode operation, regardless of the required generation amount (i.e., fuel corresponding to the rated generation amount is supplied, but the power actually generated is 0). Therefore while the degradation determining mode operation is ongoing, supplied fuel is not used for generation, but is combusted in the combustion chamber 18.

Note that in the present embodiment the fixed values for fuel supply and the like are set at values corresponding to rated generation amount, but these fixed values can be set as desired. The fuel cell module 2 is preferably capable of being thermally autonomous, and can be set at a value permitting generation of power at close to the rated generation amount, with temperature varying sufficiently greatly according to the degree of degradation of the fuel cell module 2. In the present embodiment power is not extracted from the fuel cell module 2 during the degradation determining mode operation, but it is possible to constitute the solid oxide fuel cell 1 so that a fixed power is extracted during the degradation determining mode operation, thereby performing the degradation determination with the fuel cell module 2 in a stabilized operating state. In an environment in which power can be generated and sold using the solid oxide fuel cell 1, an operating state in which fixed power is extracted can be easily obtained. It is also acceptable to furnish the solid oxide fuel cell 1 with a dummy load such as a heater (not shown) for consuming power produced during the degradation determining mode operation, so that a fixed power is extracted by causing the power produced to be thus consumed.

Next, in step S5 of FIG. 12, after operation using fixed values has begun, a judgment is made as to whether sufficient time has elapsed and a stable operating state has been achieved. In the present invention, the operating state stabilizes when the degradation determining time of 5 hours has elapsed after starting operation according to fixed values, and a judgment is made that the predetermined degradation determining operating conditions have been satisfied. If the fixed value-based time of 5 hours after start of operation has not elapsed, the step S5 process is repeated. Operation using fixed values started in step S4 is thus maintained over a period of 5 hours (FIG. 9, times t1-t2).

After fixed value-based operation has continued for 5 hours, the system advances to step S6 at time t2 in FIG. 9, and a judgment is made as to whether the temperature of the fuel cell unit 16 measured by the generating chamber temperature sensor 142 is equal to or greater than a predetermined temperature. In other words, degradation of the fuel cell module 2 is determined by comparing the temperature of the fuel cell module 2 resulting from operating the fuel cell module 2 in a stable operating state with a reference temperature serving as a predetermined degradation determination reference temperature (the ideal stack temperature value produced in the rated 700 W stable operating state with no degradation of the fuel cell module 2). In the solid oxide fuel cell 1 of the present embodiment, the reference temperature T0 of the fuel cell module 2 when operated at rated power of 700 W in the initial state is approximately 700° C.; as degradation of the fuel cell module 2 progresses, this temperature rises. This is caused by degradation of the fuel cell units 16 themselves, which are solid oxide fuel cells, and by joule heating and the like due to increased internal resistance of the fuel cell stack 14 as the result of degradation in the junction portion which electrically connects the various fuel cell units 16.

In the present embodiment, the degradation determining circuit 110a determines that the fuel cell module 2 has degraded when the temperature T1 measured by the generating chamber temperature sensor 142 is 30° C. or more above the reference temperature T0. If the fuel cell module 2 has not degraded, the system advances to step S10, and one iteration of this flow chart process is completed; no change is made to operating conditions such as the fuel supply amount.

If it is determined that a fuel cell module 2 has degraded, the system advances to step S7, and degradation processing is started. In step S7 a fuel supply correction is executed by the fuel correction circuit 110b (FIG. 6), which is a fuel correction means built into the control section 110, and the fuel supply amount and fuel supply amount gain relative to the required generation amount are changed. In other words, when it is determined for the first time after the start of use of the solid oxide fuel cell 1 that the fuel cell module 2 has degraded, the fuel correction circuit 110b changes the fuel supply amount relative to the required generation amount using the fuel supply correction from the curve F0 to the curve F1 or the curve F-1 in FIG. 10, and thereafter determines the fuel supply amount using the curves F1 or F-1. The rate of change when changing the fuel supply amount is changed from line F10 to more gradual line F11 in FIG. 11, and thereafter the fuel supply amount is changed using this rate of change. The fuel supply amount changed by the fuel supply correction is maintained until it is determined that the fuel cell module 2 has further degraded.

Note the selection of whether to perform the fuel supply correction in the increasing correction mode using the curve F1 or in the decreasing correction mode using the curve F-1 is made, as explained below, by the mode selection device 110c serving as mode selection means and the operating state recording device 110d serving as operating state recording means, both built into the control section 110. The fuel correction circuit 110b, mode selection device 110c, and operating state recording device 110d comprise a microprocessor, memory, a program for activating same, and the like (none of the above is shown).

In step S7, after a correction to the fuel supply amount is carried out, the system advances to step S8; in step S8 the temperature T2 of the fuel cell units 16 when the solid oxide fuel cell 1 is operated using the post-correction fuel supply amount is measured by the generating chamber temperature sensor 142. The measured temperature T2 is stored in the degradation determining circuit 110a memory (not shown) as a new reference temperature T0. This new reference temperature T0 is used as the reference temperature for the next degradation determination. The temperature T2 of the fuel cell units 16 is preferably measured after operation is conducted with the fuel supply amount at a fixed level for a predetermined time following correction of the fuel supply amount. This enables an accurate temperature measurement which excludes the effects of changes to the fuel supply amount by correction.

When the degradation processing described above is completed, the degradation determining circuit 110a ends the degradation determining mode operation, and the control section 110 resumes normal operation responsive to the required generation amount (FIG. 9, time t2).

Figure 13:
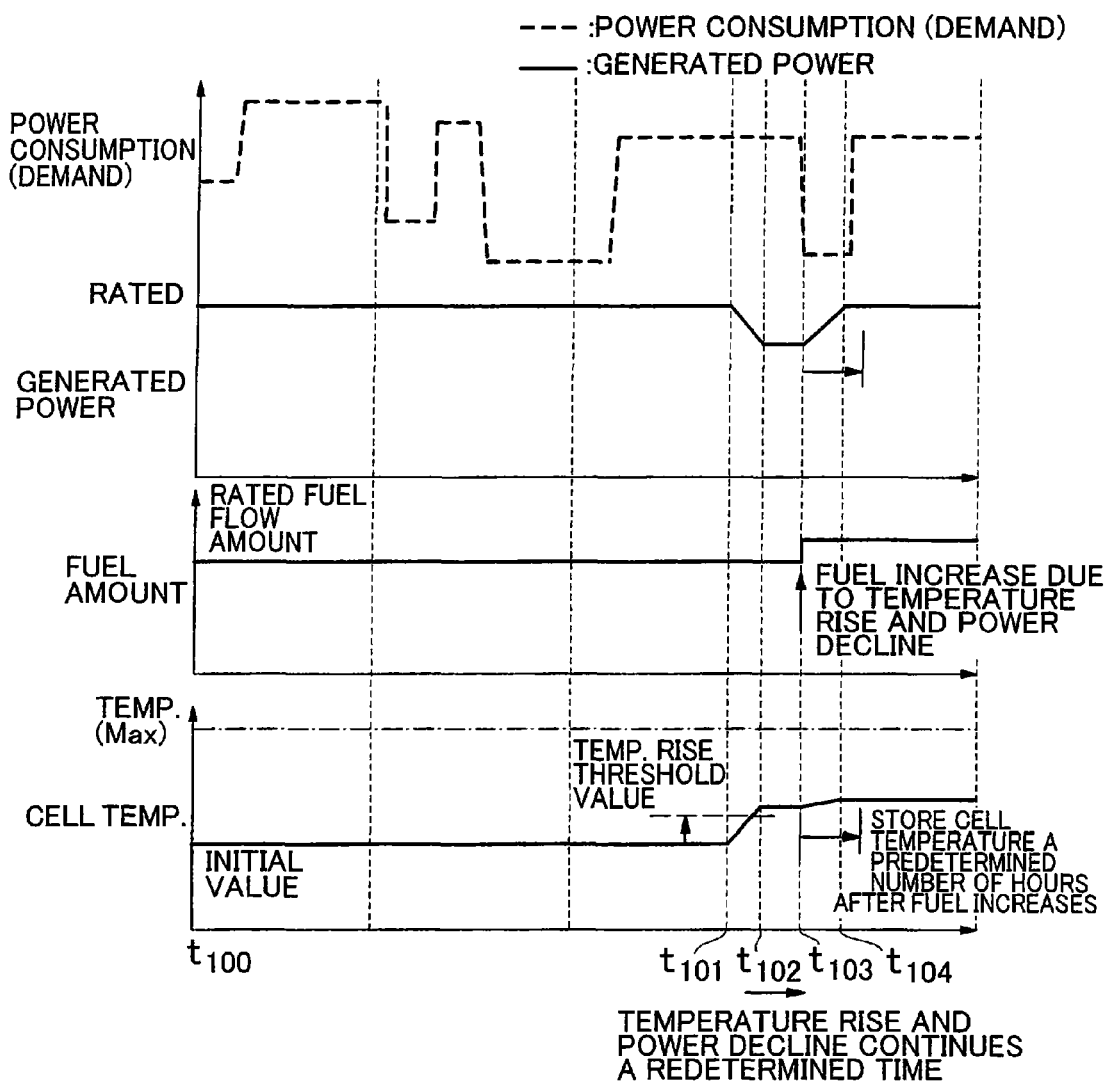
FIG. 13: A timing chart schematically depicting the operating history of a solid oxide fuel cell over approximately 1 year.
Figure 14:
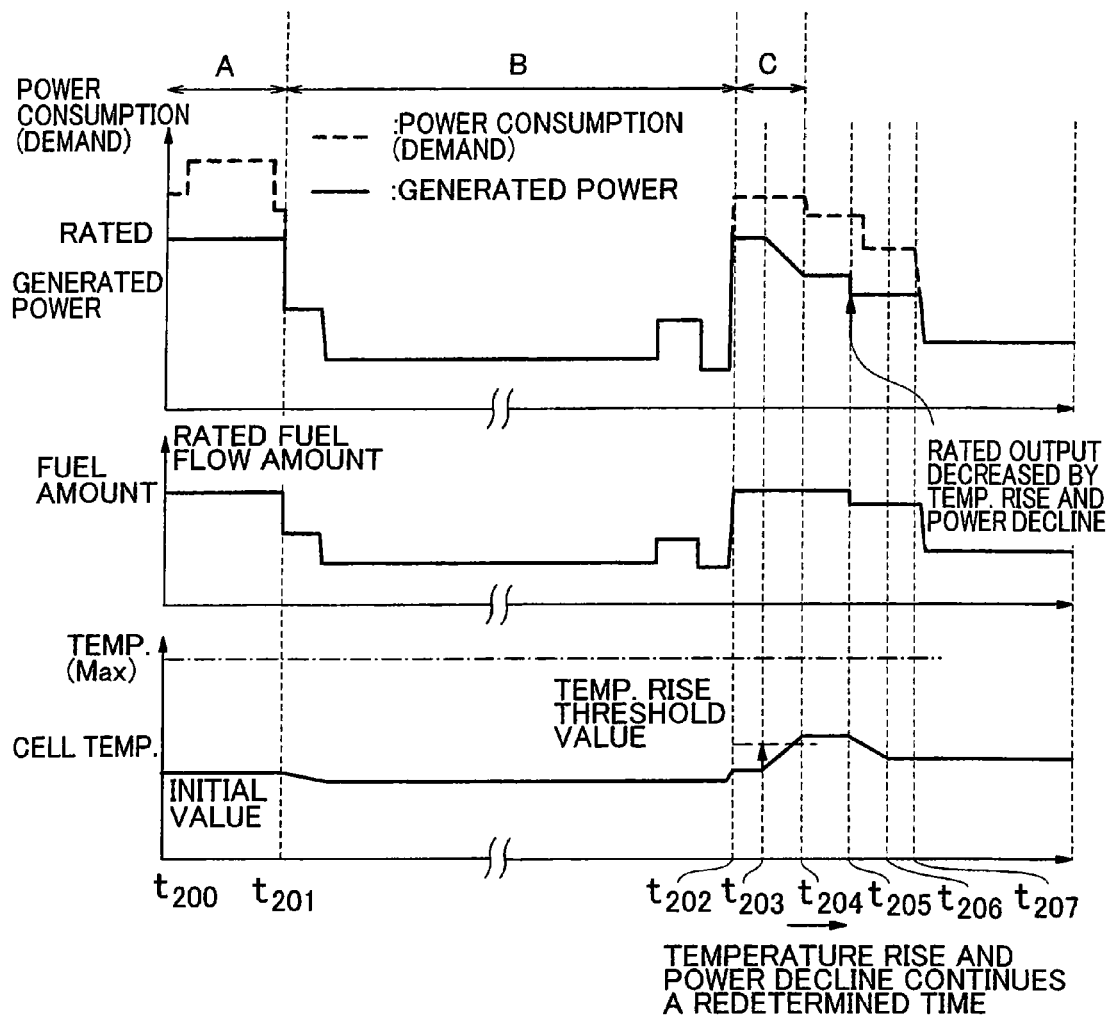
FIG. 14: A timing chart schematically depicting the operating history of a solid oxide fuel cell over approximately 1 year.

Next, referring to FIGS. 13 and 14, we discuss selection of the correction mode using the mode selection device 110c. FIGS. 13 and 14 are timing charts schematically depicting the operational history of the solid oxide fuel cell 1 over approximately 1 year; starting from the top portion, what is shown is the power consumed by a user (shown by a dotted line), the power generated by the solid oxide fuel cell 1 (shown by a solid line), the fuel supply amount, and the fuel cell unit temperature. Note that there is a tendency for the power consumption in a typical household to be large during the day and small at night, therefore the timing charts shown in FIGS. 13 and 14 extract only the operating history from 6:00 AM to 12:00 midnight, which is the primary time period for power consumption, and the operating state recording device 110d records approximately 1 year's worth of this type of operating history.

At times t100-t103 in FIG. 13, the power consumed by the user constantly exceeds the rated output power of the solid oxide fuel cell 1, which is its maximum output power, therefore an amount of fuel suited to the rated power is being constantly supplied to the fuel cell module 2, and the solid oxide fuel cell 1 is constantly generating its rated output power. Note that the portion of the consumed power not supplied by the rated output power is supplied from the electrical grid. Also, when the fuel cell module 2 degrades due to long usage, the output voltage of the fuel cell module 2 declines relative to the same fuel supply amount, and the temperature of the fuel cell units 16 rises. To output the rated power in a state in which the fuel cell module 2 output power voltage has declined requires an increase in the current extracted from the fuel cell module 2. However, if the current extracted from the fuel cell module 2 becomes too large, the burden on the fuel cell units 16 becomes great, leading to faster degradation of the cells. For this reason, in the present embodiment the current extracted from the fuel cell module 2 is restricted to a predetermined current or less. As a result of this current value restriction, the output power falls at times t101-t102 in FIG. 13, even though the fuel supply amount is constant.

Next, at time t103 in FIG. 13, the above-described degradation determination is executed. At time t103, the temperature T1 of the fuel cell units 16 is 30° C. or more higher than the reference temperature T0 of the fuel cell units 16 at initial use, therefore the degradation determining circuit 110a determines that the fuel cell module 2 has degraded (step S6 in FIG. 12).

The operating state recording device 110d records operating history during the daytime for the solid oxide fuel cell 1 over the past 1 year, and the mode selection device 110c automatically selects the increasing correction mode or the decreasing correction mode based on past operating states recorded in the operating state recording device 110d. In the example shown in FIG. 13, power consumption is constantly higher than the rated output power, and the fuel cell module 2 is constantly outputting its rated output power, therefore the mode selection device 110c selects the increasing correction mode, which causes the fuel correction circuit 110b to make an increasing correction to the fuel supply amount. By the increasing correction, the control section 110 changes the curve for determining the fuel supply amount from curve F0 to curve F1 in FIG. 10, and the fuel supply amount is increased (time t103 in FIG. 13). As a result of the increase in the fuel supply amount, the power output by the fuel cell module 2 is restored to the initial rated output power (times t103-t104 in FIG. 13). The temperature of the fuel cell units 16 after a predetermined time has elapsed from the increasing correction is stored as reference temperature T0 in the degradation determining circuit 110a and used in the next degradation determination.

As shown in the FIG. 13 example, in cases where the time during which the rated output power is being produced was long within a predetermined period in the past, an increasing correction is selected to maintain the initial rated output power when it is determined that the fuel cell module 2 has degraded. This makes it possible to reduce the amount of power received from the electrical grid and thereby cut the cost of power purchases from the grid.

On the other hand, in the example shown in FIG. 14, the time in the operating history recorded in the operating state recording device 110d during which the user's power consumption was below the rated power of the solid oxide fuel cell 1 (times t201-t202 in FIG. 14) is longer than the time during which that consumption was higher (times t200-t201 and t202-t205 in FIG. 14). Also, in the FIG. 14 example, the fuel cell module 2 degrades due to long use at times t203-t204, and the output power for the same fuel supply amount declines as the temperature of the fuel cell units 16 rises. Note that the decline in output power at times t203-t204 is also the result of the restriction on the current value extracted from the fuel cell module 2.

Next, at time t205 in FIG. 14, a degradation determination is executed. At time t204, the temperature T1 of the fuel cell units 16 is 30° C. or more higher than the reference temperature T0 of the fuel cell units 16 at initial use, therefore the degradation determining circuit 110a determines that the fuel cell module 2 has degraded (step S6 in FIG. 12).

As shown in the FIG. 14 example, when, as an operating state, the time within a predetermined past period during which the solid oxide fuel cell 1 was operated at less than its rated output was longer than the time during which it was operated at or above its rated output, the mode selection device 110c selects a decreasing correction mode if the degradation determining circuit 110a determines that the fuel cell module 2 has degraded. This causes the fuel correction circuit 110b to execute a correction to decrease the fuel supply amount. By the decreasing correction the control section 110 changes the curve for determining the fuel supply amount from curve F0 to curve F-1 in FIG. 10, and the fuel supply amount is decreased (time t205 in FIG. 14). The reduction in the fuel supply amount causes the fuel cell module 2 output power to be reduced, but the temperature of the fuel cell units 16 also declines (times t205-t207 in FIG. 14). The temperature of the fuel cell units 16 after a predetermined time has elapsed from the decreasing correction (the temperature at times t206-t208 in FIG. 14) is stored as reference temperature T0 in the degradation determining circuit 110a and used in the next degradation determination.

As shown in the FIG. 14 example, when the time in past operating states during which operation was conducted at less than the rated output power was long, a decreasing correction is selected. This results in an increase to the amount of power received from the electrical grid when the power consumed by the user is large, but because that time period is short, the cost of power purchases from the electrical grid does not increase very much. On the other hand, the temperature of the fuel cell units 16 decreases due to the decreasing correction of the fuel supply amount, therefore degradation of the fuel cell module 2 can be restrained.

As explained above, when it is determined for the first time by the degradation determining circuit 110a that the fuel cell module 2 has degraded, the mode selection device 110c selects either the decreasing correction mode or the increasing correction mode. When degradation of the fuel cell module 2 is determined for the first time, and the decreasing correction mode is selected, the curve which determines the fuel supply amount is changed from the curve F0 in FIG. 10 to the curve F-1, in which the fuel supply amount is reduced by 10% relative to curve F0. After this fuel supply correction, the fuel supply amount is reduced relative to the same required generation amount, and the power actually output relative to required generation amount is reduced. After fuel supply correction, the actual output power of the fuel cell module 2 relative to the required generation amount of 700 W, which is the initial rated output power, is treated as a reduced new rated output power. By reducing the fuel supply amount, excessive rises in the fuel cell module 2 temperature are prevented. A sudden change to the amount of fuel supplied to a fuel cell module 2 can lead to further degradation, therefore the rate of change in the fuel supply amount is made smaller.

Furthermore, when, in the decreasing correction mode, degradation of the fuel cell module 2 advances and the fuel cell module 2 is determined to have further degraded, the fuel supply amount is changed from curve F-1 to curve F-2, and when there is still another decreasing correction, it is changed from curve F-2 to curve F-3. The curve F-2 represents a 20% fuel supply amount reduction relative to curve F0, and the curve F-3 a 30% reduction relative to curve F0. Excessive burden on the fuel cell units 16 in which degradation is progressing can in this way be prevented. The fuel supply amount gain is also changed from line F11 to line F12 on the second execution of a decreasing correction, and from line F12 to line F13 on the third execution of a decreasing correction.

On the other hand, when degradation of the fuel cell module 2 is determined for the first time, and the increasing correction mode is selected, the curve which determines the fuel supply amount is changed from the curve F0 to the curve F1 in FIG. 10, in which the fuel supply amount is increased by 10% relative to curve F0. After this fuel supply correction, the fuel supply amount relative to the same required generation amount is increased, and the initial rated output power of 700 W is maintained even if the fuel cell module 2 has degraded. By increasing the fuel supply amount, a power equal to that at the initial usage period of the fuel cell module 2 can be extracted.

Furthermore, when degradation of the fuel cell module 2 advances in the increasing correction mode and the fuel cell module 2 is determined to have further degraded, the fuel supply amount is changed from curve F1 to curve F2; when there is still another increasing correction, it is changed from curve F2 to curve F3. The fuel supply amount in curve F2 is decreased 18% relative to curve F0, and 23% in curve F3 relative to curve F0. Thus by decreasing the amount of increase to the fuel as degradation progresses, the rise in temperature and excessive burden on the fuel cell units 16 in which degradation is progressing can be prevented. And as in the decreasing correction mode, the fuel supply amount gain is changed from line F11 to line F12 on the second execution of a decreasing correction, and from line F12 to line F13 on the third execution of a decreasing correction.

Thus in the present embodiment the amount of change to the fuel supply amount is a pre-set fixed value, both when executing a decreasing correction and when executing an increasing correction. Corrections greatly in error can therefore be prevented from occurring, unlike, for example, when the fuel supply amount correction amount is calculated based on the temperature rise in the fuel cell units 16, or based on the amount of reduction in output power. In other words, the temperature or output power of the fuel cell units 16 is affected by various factors which change their values, so calculating the amount of correction based on these values results in the execution of anomalous corrections when an anomalous temperature or output power is measured due to some factor.

Figure 15:
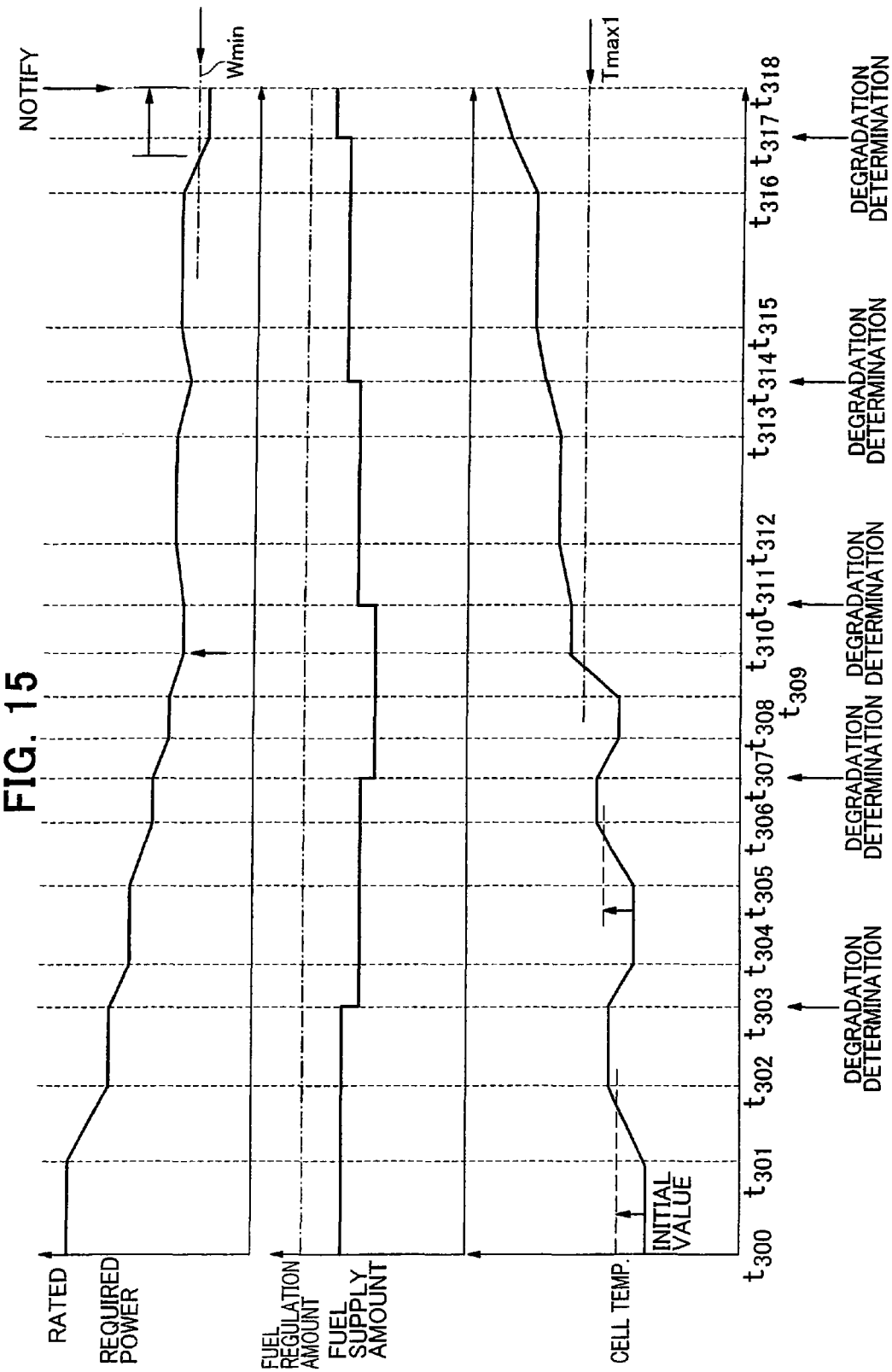
FIG. 15: A timing chart showing an example of the action of a solid oxide fuel cell when the decreasing correction mode is selected by a mode selection device.
Figure 16:
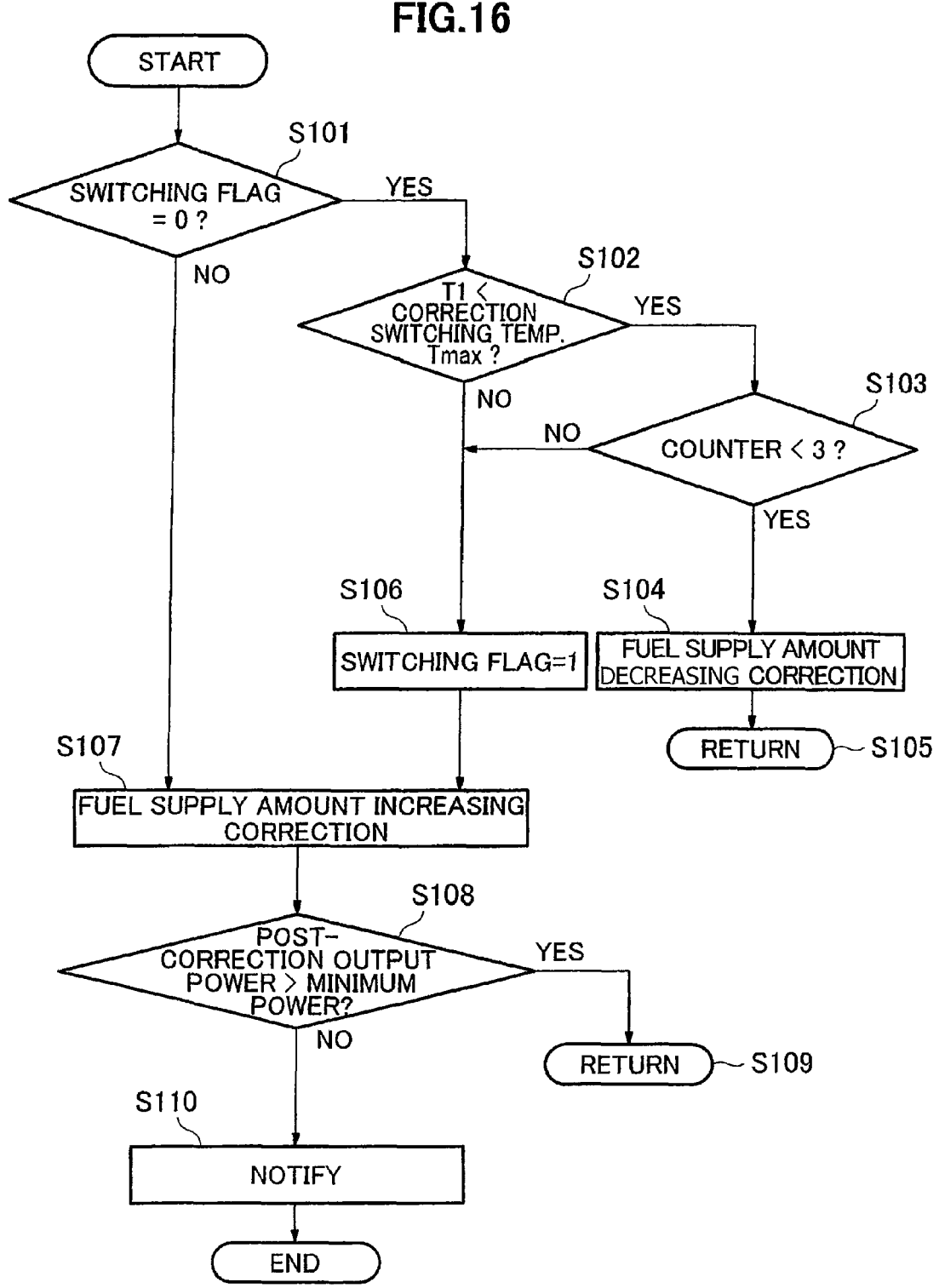
FIG. 16: A flow chart of fuel correction processing in the decreasing correction mode.
Figure 17:
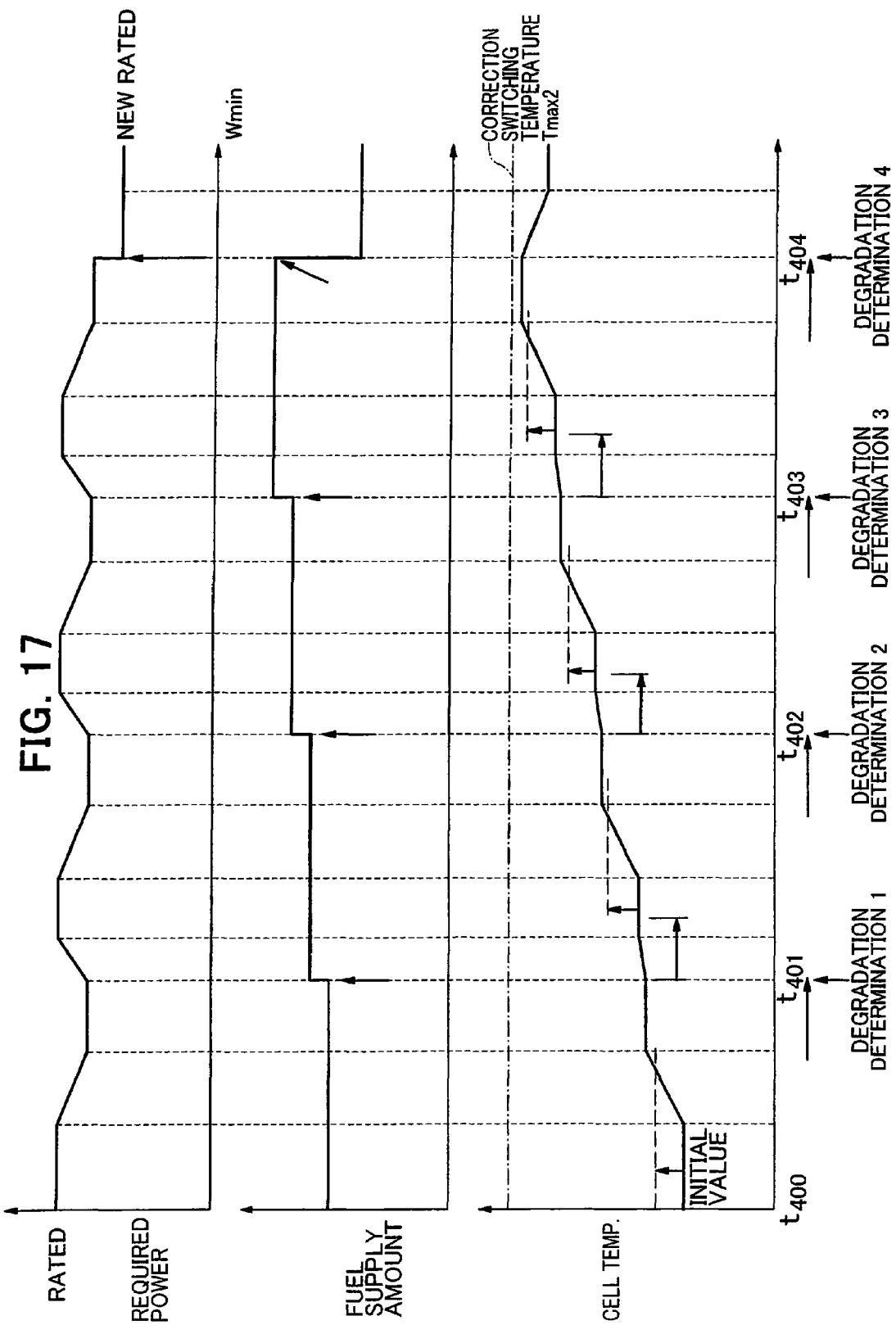
FIG. 17: A timing chart showing an example of the action of a solid oxide fuel cell when the increasing correction mode is selected by a mode selection device.
Figure 18:
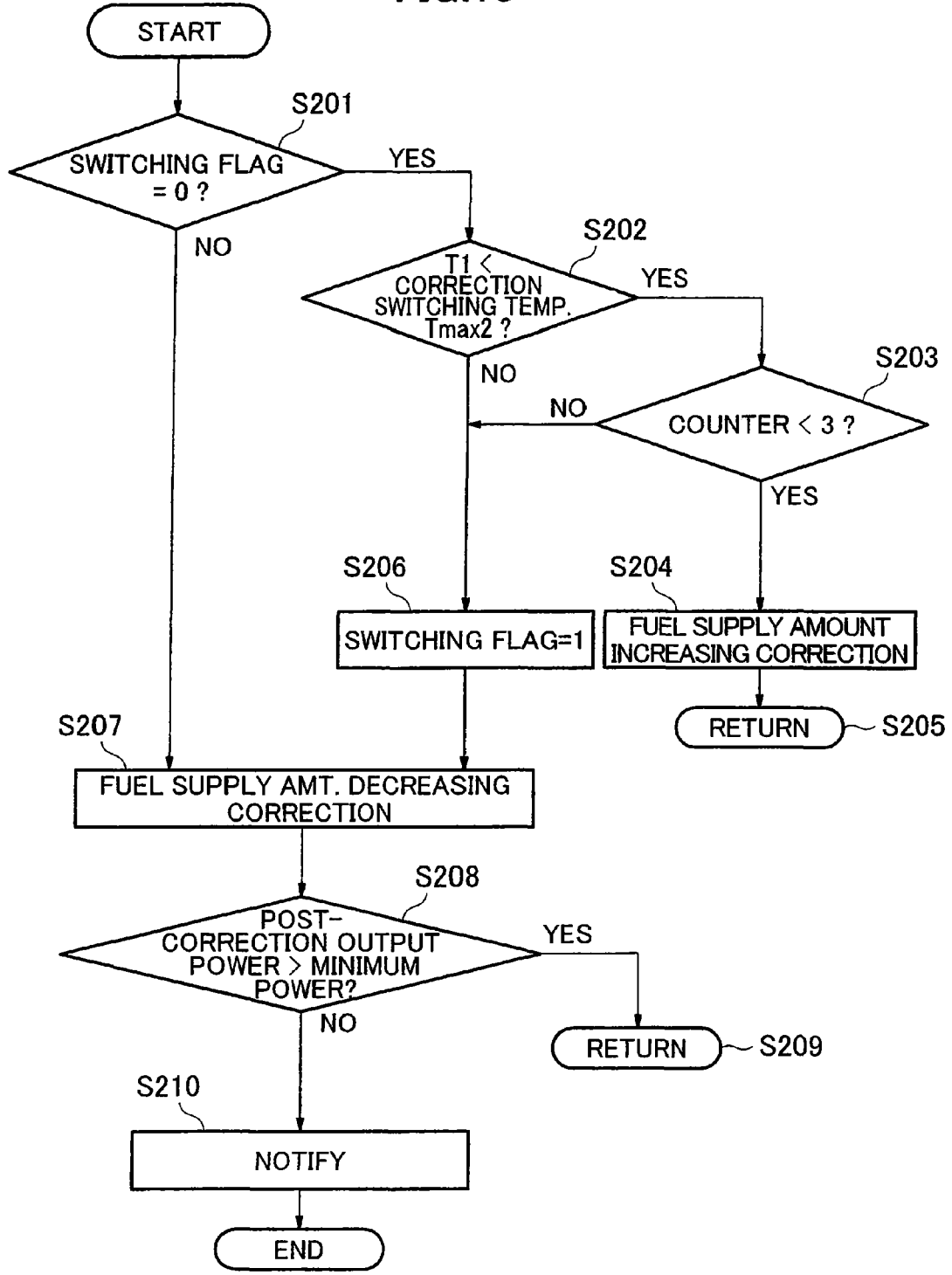
FIG. 18: A flow chart of fuel correction processing in the increasing correction mode.

Next, referring to FIGS. 15 through 18, we discuss details of a fuel correction by the fuel correction circuit 110b. FIG. 15 is a timing chart showing an example of the action of the solid oxide fuel cell 1 when the decreasing correction mode is selected by the mode selection device 110c; FIG. 16 is a flow chart of fuel correction processing in the decreasing correction mode. FIG. 17 is a timing chart showing an example of the action of the solid oxide fuel cell 1 when the increasing correction mode is selected; FIG. 18 is a flow chart of fuel correction processing in the increasing correction mode.

Note that FIGS. 15 and 17 are timing charts in which the horizontal axis shows time, and the vertical axis shows output power, fuel supply amount, and fuel cell unit temperature, but these are schematically showing the fuel cell operating states over a much longer time period than the timing chart shown in FIG. 9. Also, because the timing charts are simplified, the solid oxide fuel cell 1 is depicted as always being operated at rated output power. The flow charts shown in FIGS. 16 and 18 are called as subroutines by step S7 in the flow chart shown in FIG. 12; when the decreasing correction mode is selected, the FIG. 16 flow chart is called, and when the increasing correction mode is selected, the FIG. 18 flow chart is called.

Initial use of the solid oxide fuel cell 1 is begun at time t300 in FIG. 15. At the time of initial operation, rated output power is obtained by operating the solid oxide fuel cell 1 at a specified fuel supply amount; the temperature at this point is stored in the degradation determining circuit 110a as the initial reference temperature T0 for fuel cell units 16. Degradation of the fuel cell module 2 begins as the solid oxide fuel cell 1 usage time extends, reducing the output voltage of the fuel cell module 2 relative to the same amount of fuel supplied. Output power declines together with the decline in this output voltage as a result of the operation of the output current restriction, and the temperature of the fuel cell units 16 also rises (times t301-t302 in FIG. 15).

Next, at time t303, a degradation determination is carried out and the flow chart shown in FIG. 12 is executed. At time t303, the temperature of the fuel cell unit 16 during rated output power operation has risen 30° C. or more above the reference temperature T0 (the temperature at time t300), therefore it is determined that a fuel cell module 2 has degraded, and processing shifts from step S6 to step S7 in FIG. 12. In the example shown in FIG. 15, the decreasing correction mode is selected by the mode selection device 110c. Because the decreasing correction mode was selected, the subroutine shown in FIG. 16 is called by step S7 in FIG. 12.

In step S101 of FIG. 16, the value of the switching flag FL1 is determined. In the solid oxide fuel cell 1 initial state, the switching flag FL1 is set to 0, therefore processing moves to step S102. In step S102, a determination is made of the temperature T1 of the fuel cell unit 16 at time t303. In other words, when the required generation amount is the rated power, the temperature T1 of the fuel cell units 16 is less than the correction switching temperature Tmax1 in the decreasing correction mode, which is a predetermined correction switching condition, the system advances to step S103; if the temperature T1 is equal to or greater than the correction switching temperature Tmax1, the system advances to step S106. Note that in the present embodiment, the correction switching temperature in the decreasing correction mode is set to Tmax1=800° C.

In step S103, the value of the decreasing correction iteration counter is determined. The decreasing correction iteration counter is a counter for totaling the number of iterations of decreasing corrections to the fuel supply amount after the initial start of use. If the number of decreasing corrections is less than 3, the system advances to step S104; if 3 or greater, it advances to step S106.

In step S104, the fuel supply amount is corrected to decrease (time t303 in FIG. 15) so that degradation of the degraded fuel cell module 2 does not advance, and the decreasing correction iteration counter is increased by 1. At this point, if this is the first decreasing correction, the curve determining the fuel supply amount is changed from curve F0 to curve F-1 in FIG. 10, and the decreasing correction iteration counter value is changed from a 0 to a 1. The temperature when a predetermined time has elapsed after a decreasing correction to the fuel supply amount (the temperature at times t304-t305 in FIG. 15) is updated and stored as a new reference temperature T0 (step S8 in FIG. 12). As a result of this decreasing correction to the fuel supply amount, the rated output power actually output by the solid oxide fuel cell 1 declines, as does the temperature of the fuel cell units 16 (times t303-t305 in FIG. 15).

When a further solid oxide fuel cell 1 usage period has elapsed, degradation of the fuel cell module 2 advances further, and output power relative to fuel supply amount declines, while the temperature of the fuel cell unit 16 also rises (times t305-t306 in FIG. 15). Next, at time t307, a degradation determination is performed. At time t307, the temperature of the fuel cell unit 16 during rated output power operation has risen 30° C. or more above the updated reference temperature T0 (the temperature at times t304-t305), therefore a degradation is determined to have occurred, and processing shifts from step S6 to step S7 in the flow chart shown in FIG. 12.

Here, at the time t303 where it was first determined that a degradation of the fuel cell module 2 had occurred, the decreasing correction mode is selected, therefore at step S7 in FIG. 12 the FIG. 16 flow chart is called, and steps S101, S102, S103, and S104 are executed in sequence. If this is second decreasing correction, the curve determining the fuel supply amount is changed from curve F-1 to curve F-2 in FIG. 10; the decreasing correction iteration counter value is changed from a 1 to a 2, and the fuel supply amount is further corrected downward (time t307 in FIG. 15). As a result of this decreasing correction to the fuel supply amount, the output power actually output by the solid oxide fuel cell 1 declines, as does the temperature of the fuel cell units 16 (times t307-t308 in FIG. 15).

When degradation of the fuel cell module 2 further advances, the output power of the solid oxide fuel cell 1 declines, and the temperature of the fuel cell units 16 increases (times t309-t310 in FIG. 15). Next, at time t311, a degradation determination is performed.

At time t311, the temperature of the fuel cell units 16 during rated output power operation has risen 30° C. or more above the updated reference temperature T0 (the temperature at times t308-t309), therefore processing shifts from step S6 to step S7 in the flow chart shown in FIG. 12. As described above, the decreasing correction mode is selected, therefore at step S7 the FIG. 16 flow chart is called, and steps S101, and S102 are executed in sequence. In step S102, the temperature T1 of the fuel cell units 16 at time t311 exceeds the correction switching temperature Tmax1 in the decreasing correction mode, therefore the system moves to step S106.

In step S106, the switching flag FL1 value is changed from a 0 to a 1. The switching flag FL1 is a flag indicating whether, in the decreasing correction mode, the fuel correction circuit 110b is executing a correction to reduce the rated output power so that the fuel supply amount is reduced. When the value of the switching flag FL1 is a 0, a decreasing correction is applied to the fuel supply amount; when the switching flag FL1 value is switched to a 1, thereafter the fuel correction circuit 110b causes the fuel supply amount to increase, and executes a correction in the direction of maintaining the diminishing rated output power (step S107 in FIG. 16). Thus when the decreasing correction mode is selected, the fuel correction circuit 110b first executes a correction to reduce the fuel supply amount, and when degradation of the fuel cell module 2 has progressed to some degree and the correction switching conditions are satisfied, i.e., when the correction switching temperature Tmax1 is exceeded, the fuel supply amount is increased and a correction is executed so that the rated output power does not decline any further.

Note that in the timing chart shown in FIG. 15, the value of the switching flag FL1 is changed from 0 to 1 due to the fact that the temperature of the fuel cell units 16 during rated output operation exceeds the correction switching temperature Tmax1, but the switching flag FL1 value is changed from 0 to 1 even when a decreasing correction of the fuel supply amount has been performed 3 times in the past (step S103 in FIG. 16); thereafter corrections are executed to increase the fuel supply amount.

Next, in step S107, a correction to increase the fuel supply amount is executed so as to maintain the rated output power being diminished (the output power at times t308-t309 in FIG. 15). Specifically, the fuel correction circuit 110b increases the fuel supply amount by a pre-set fixed value only (time t311 in FIG. 15). This increasing correction of the fuel supply amount causes output power to recover, while at the same time the temperature of the fuel cell units 16 increases (times t311-t312 in FIG. 15).

Furthermore, in step S108 a determination is made of the output power value (the power at times t312-t313 in FIG. 15) after an increasing correction of the fuel supply amount is performed. When the post-increasing correction output power is larger than a predetermined minimum power Wmin, the system advances to step S109, and one iteration of the FIG. 16 flow chart is completed. If the output power is the predetermined minimum power Wmin or less, the system advances to step S110.

When a further usage period elapses, degradation of the fuel cell module 2 advances further, and output power relative to fuel supply amount declines, while the temperature of the fuel cell unit 16 also rises (times t313-t314 in FIG. 15).

Next, at time t314, a degradation determination is performed; if it is determined that further degradation of the fuel cell module 2 has occurred, steps S101 and S107 in the FIG. 16 flow chart are executed in sequence. At step S107, the fuel correction circuit 110b further increases the fuel supply amount by a pre-set fixed value only (time t314 in FIG. 15). This increasing correction of the fuel supply amount causes output power to recover, while at the same time the temperature of the fuel cell units 16 increases (times t314-t315 in FIG. 15). The recovered output power (the output power at times t315-t316 in FIG. 15) is larger than the minimum power Wmin, therefore the system advances to step S109, and one iteration of the FIG. 16 flow chart processing is completed.

When a further usage period elapses, degradation of the fuel cell module 2 advances further, and output power relative to fuel supply amount declines, while the temperature of the fuel cell unit 16 also rises (times t316-t317 in FIG. 15).

Next, at time t317, a degradation determination is performed; if it is determined that further degradation of the fuel cell module 2 has occurred, steps S101 and S107 in the FIG. 16 flow chart are executed in sequence. At step S107, the fuel correction circuit 110b further increases the fuel supply amount (time t317 in FIG. 15). However, because degradation of the fuel cell module 2 is advancing, there is no recovery of the output power, and only the temperature of the fuel cell units 16 rises (times t317-t318 in FIG. 15).

Next, in step S108, the post-increasing correction output power (the output power at time t318 in FIG. 15) is compared to the minimum power Wmin. At time t318, the output power is at or below the minimum power Wmin, so the system advances to step S110. In step S110, the control section 110 sends a signal to the warning device 116 to inform users that the solid oxide fuel cell 1 has reached its product life, and stops operation of the fuel cell module 2.

Next, referring to FIGS. 17 and 18, we discuss the action of the solid oxide fuel cell 1 in this embodiment when the increasing correction mode has been selected. Note that the flow chart shown in FIG. 18 is essentially the same as the flow chart shown in FIG. 16; it differs from FIG. 16 with respect to the points that in step S202 of FIG. 18 the temperature T1 of the fuel cell units 16 is compared to the correction switching temperature Tmax2 in the increasing correction mode, that in step S204 the fuel supply amount is corrected to increase, and that in step S208 the fuel supply amount is corrected to decrease. Note that in the present embodiment, the correction switching temperature in the increasing correction mode is set to Tmax2=900° C.

At time t400 in FIG. 17, initial use of the solid oxide fuel cell 1 is started. At time t401, a degradation of the fuel cell module 2 is first determined, and the increasing correction mode is selected using the mode selection device 110c. The FIG. 18 flow chart is thus called by step S7 in FIG. 12. In the FIG. 18 flow chart, steps S201, S202, S203, and S204 are executed in sequence, and an increasing correction of the fuel supply amount is executed by the fuel correction circuit 110b (step S204 in FIG. 18). The curve determining the fuel supply amount is thus changed from curve F0 to curve F1 in FIG. 10, and the increasing correction iteration counter value is changed from a 0 to a 1.

At time t402 in FIG. 17, where degradation has progressed further, the degradation determining circuit 110a makes a second determination of fuel cell module 2 degradation, and a second increasing correction to the fuel supply amount is executed by the fuel correction circuit 110b. The curve determining the fuel supply amount is thus changed from curve F1 to curve F2 in FIG. 10. At time t403 a third determination of fuel cell module 2 degradation is made, and a third increasing correction of the fuel supply amount is executed. The curve determining the fuel supply amount is thus changed from curve F2 to curve F3 in FIG. 10.

Next, at time 1404 in FIG. 17, a fourth determination of fuel cell module 2 degradation is made, and the FIG. 18 flow chart is called by step S7 in FIG. 12. At time t404, increasing corrections have been made 3 times in the past, therefore in the FIG. 18 flow chart steps S201, S202, S203, and S206 are executed in sequence, and the value of switching flag FL2 is changed from 0 to 1. Next, in step S207, a decreasing correction of the fuel supply amount is executed by the fuel correction circuit 110b (time t404 in FIG. 17). Because the value of switching flag FL2 is changed to a 1, a decreasing correction of the fuel supply amount is made when it is determined by the degradation determining circuit 110a that the fuel cell module 2 has degraded. As in the case of the decreasing correction mode, this degradation determination and decreasing correction of the fuel supply amount is repeated until the post-correction output power falls below the minimum power Wmin.

In the solid oxide fuel cell 1 of this embodiment of the invention, the mode selection device 110c selects the increasing correction mode (time t103 in FIG. 13) or the decreasing correction mode (time t205 in FIG. 14), therefore an appropriate mode can be selected in accordance with fuel cell usage conditions, so that product life can be extended while a practical output power is maintained.

In the solid oxide fuel cell 1 of this embodiment of the invention, the mode selection device 110c selects the correction mode based on past operating states stored in the operating state recording device 110d, therefore an appropriate correction mode can be automatically selected.

Moreover, in the solid oxide fuel cell 1 of this embodiment of the invention when, as a fuel cell module 2 past operating state, the time during which the rated output power was being output is longer, the increasing correction mode is selected (FIG. 13) and the rated output voltage is maintained even after the fuel cell module 2 has degraded, therefore grid power utilization charges can be saved. On the other hand, when the time during which the rated output power is output is shorter, the decreasing correction mode is selected (FIG. 14), and rated output voltage declines, therefore the amount of fuel consumption by the fuel cell module 2, whose efficiency has declined due to degradation, can be restrained, and energy can be conserved.

We have explained preferred embodiments of the present invention above, but various changes may be added to the above-described embodiments. In the embodiment described above, the mode selection device 110c was selecting the increasing correction mode or the decreasing correction mode based on the entire operating history, until from the point of the first determination of fuel cell module 2 degradation, but as a variation the correction mode could also be selected based on recent operating history.

Figure 19:
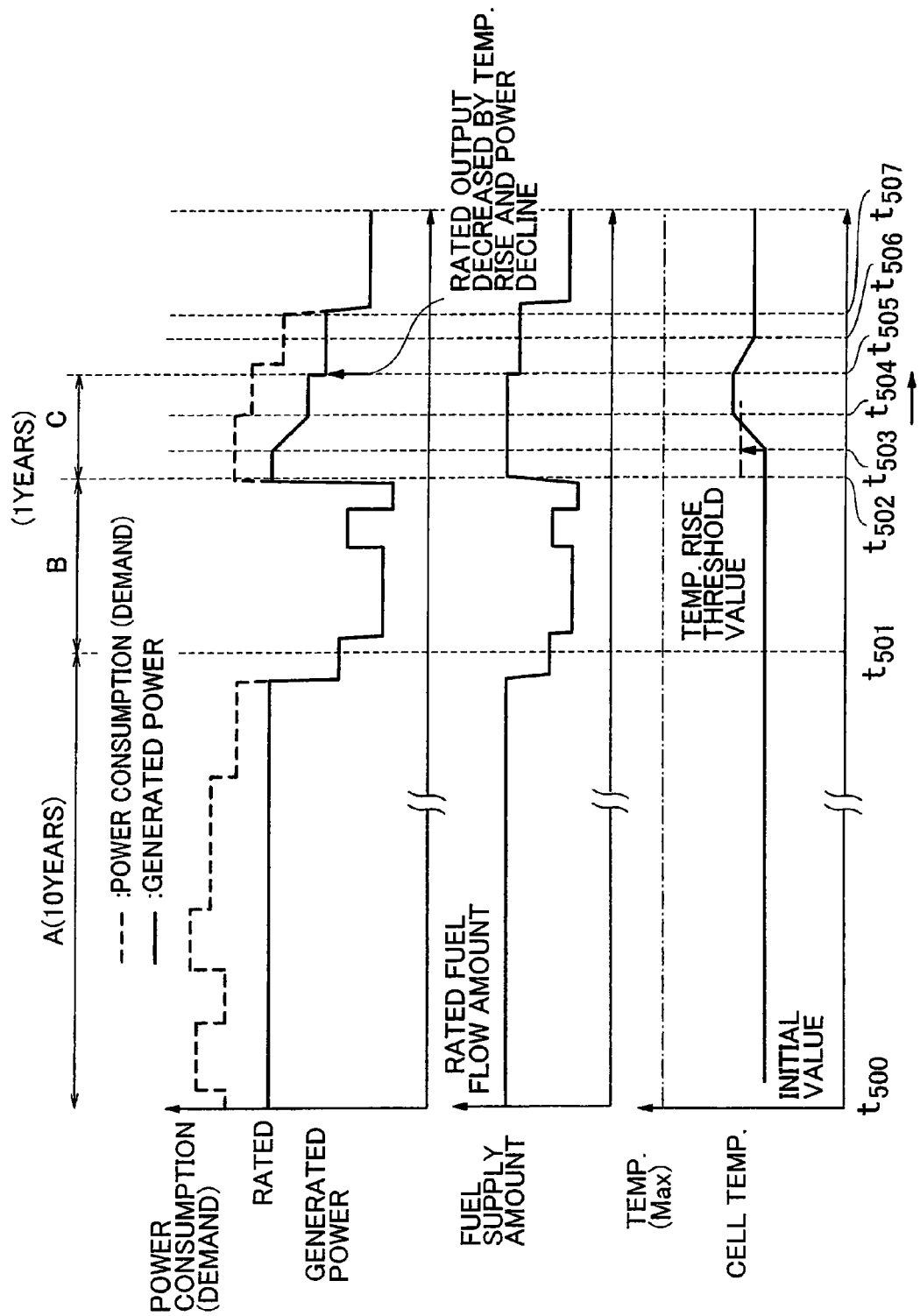
FIG. 19: A flow chart showing correction mode selection by the mode selection device in a variation.

In the timing chart example shown in FIG. 19, initial use is started at time t500, and power equal to or greater than the rated power of the solid oxide fuel cell 1 is consumed until around time t501, when 10 years have elapsed; thereafter power consumption diminishes due to changes in user family composition and the like. If the degradation determining circuit 110a here determines that the fuel cell module 2 has degraded during the period from time t501 to time t505 one year later, then in the above-described embodiment the period during which consumed power is equal to or greater than rated power is shorter than the period during which consumed power is less than rated power, therefore the increasing correction mode is selected by the mode selection device 110c. In this variation, the increasing correction mode is selected based on the operating state during the most recent one year from times t501 to t505 in FIG. 19, therefore the decreasing correction mode is selected by the mode selection device 110c. A decreasing correction is thus executed at time t505 in FIG. 19, and the rated power is reduced.

In this variation, the correction mode is selected based on the operating state in a predetermined recent period, therefore the appropriate post-degradation determination correction mode can be selected if the user's power consumption trends have changed subsequent to initial start of use.

In the above-described embodiment the correction mode was selected automatically by the mode selection device 110c built into the control section, but as a variation, the present invention could be constituted by providing a mode selecting operating device 112 for selecting the increasing correction mode or decreasing correction mode so that the correction mode could be selected by manipulating the operating device 112.

In this case, the mode selecting operating device 112 could be constituted to be set as desired at the time the solid oxide fuel cell is shipped from the factory. In a variation thus constituted, an appropriate correction mode could be pre-selected in accordance with the location at which the solid oxide fuel cell is to be installed.

Alternatively, the mode selecting operating device 112 could be constituted to be manipulable by users when a fuel cell module is first determined to have degraded. In a variation thus constituted, an appropriate correction mode could be pre-selected according to future electrical usage conditions anticipated by the user.

In the above-described embodiment the selection of a correction mode by the mode selection device when the fuel cell module was first determined to have degraded was carried out only once, but as a variation the present invention could also be constituted to carry out the correction mode selection multiple times. For example, the present invention could be constituted so that a correction mode selection was performed each time a predetermined number of fuel cell module degradation determinations occurred.

In the variation thus constituted, an appropriate correction mode could be reselected in cases where a user's power demand trends changed after the correction mode had already been selected once.

EXPLANATION OF REFERENCE NUMERALS

1: Solid oxide fuel cell
2: Fuel cell module
4: Auxiliary unit
8: Sealed space
10: Electrical generating chamber
12: Fuel cell assembly
14: Fuel cell stack
16: fuel cell units (solid oxide fuel cells)
18: Combustion chamber
20: Reformer
22: Heat exchanger for air
24: Water supply source
26: Pure water tank
28: Water flow rate regulator unit (water supply device; water supply means)
30: Fuel supply source
38: Fuel flow rate regulator unit (fuel supply device, fuel supply means)
40: Air supply source
44: Reforming air flow rate regulator unit
45: Generating air flow rate regulator unit (oxidant gas supply device; oxidant gas supply means)
46: First heater
48: Second heater
50: Hot water production device
52: Control box
54: Inverter
83: Ignition device
84: Fuel cells
110: Control section (controller, control means)
110a: Degradation Determining Circuit (degradation determining means)
110b: Fuel correction circuit (fuel correction means)
110c: mode selection device (mode selection means)
110d: operating state recording device (operating state recording means)
112: Operating device
114: Display device
116: Warning device
126: Power state detection sensor
142: Generating chamber temperature sensor (temperature detection means)
150: Outside air temperature sensor

The invention claimed is:

1. A solid oxide fuel cell system comprising:
a fuel cell module comprising multiple fuel cell units;
a fuel supply device configured to supply fuel to the fuel cell module according to a fuel supply function which defines a relationship between a demand for output power from a the fuel cell module and an amount of fuel supply to the fuel cell module for meeting the demand for output power;
an oxidation gas supply device configured to supply oxidation gas to the fuel cell module; and
a controller programed to control the amount of fuel supply from the fuel supply device, the controller comprising a degradation determining circuit programed to determine degradation of the fuel cell module, and a fuel correction circuit programed to correct the fuel supply function to adjust the amount of fuel supply from the fuel supply device, based on a result of determination performed by the degradation determining circuit, wherein the fuel correction circuit is programed to execute, when the fuel cell module is determined to have degraded, one of (i) an increasing correction mode in which the fuel supply function is corrected to increase the amount of fuel supply to the fuel cell module so that a maximum rated output power of the fuel cell module is maintained, and (ii) a decreasing correction mode in which the fuel supply function is corrected to decrease the maximum rated output power so that the fuel supply amount is reduced, and the solid oxide fuel cell system has a mode selection device which selects the increasing correction mode or the decreasing correction mode.

2. The solid oxide fuel cell system of claim 1, wherein the mode selection device comprises an input device manually operated to select the increasing correction mode or the decreasing correction mode.

3. The solid oxide fuel cell system of claim 1, further comprising an operating state recording device which records an operation history of the fuel cell module, wherein the mode selection device selects the increasing correction mode or the decreasing correction mode based on the operation history of the fuel cell module recorded in the operating state recording device.

4. The solid oxide fuel cell system of claim 3, wherein the operating state recording device records the operation history which comprises a history of power outputted by the fuel cell module, and when, during a predetermined past period, a time during which the fuel cell module was outputting the maximum rated output power was longer than a time during which the fuel cell module was outputting less than the maximum rated output power, the mode selection device selects the increasing correction mode, whereas when, during the predetermined past period, the time during which the fuel cell module was outputting the maximum rated output power was shorter than the time during which it was outputting less than the maximum rated output power, the mode selection device selects the decreasing correction mode.

* * * * *